United States Patent
Levitsky et al.

(10) Patent No.: US 11,658,766 B2
(45) Date of Patent: May 23, 2023

(54) TECHNIQUES FOR INDICATING A WAVEFORM CONFIGURATION

(71) Applicant: QUALCOMM Incorporated, San Diego, CA (US)

(72) Inventors: Michael Levitsky, Rehovot (IL); Ran Berliner, Kfar-Aviv (IL); Hung Dinh Ly, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 17/172,657

(22) Filed: Feb. 10, 2021

(65) Prior Publication Data

US 2022/0123856 A1  Apr. 21, 2022

Related U.S. Application Data

(60) Provisional application No. 63/092,376, filed on Oct. 15, 2020.

(51) Int. Cl.
*H04W 72/04* (2023.01)
*H04L 1/00* (2006.01)
(Continued)

(52) U.S. Cl.
CPC .......... *H04L 1/0004* (2013.01); *H04L 1/1819* (2013.01); *H04L 27/2607* (2013.01); *H04L 27/2636* (2013.01)

(58) Field of Classification Search
CPC ... H04L 1/0004; H04L 1/1819; H04L 1/0026; H04L 1/1822; H04L 1/1893;
(Continued)

(56) References Cited

U.S. PATENT DOCUMENTS

2018/0049173 A1* 2/2018 Chen .................... H04L 5/0048
2018/0124710 A1* 5/2018 Ly ........................ H04W 52/146
(Continued)

OTHER PUBLICATIONS

R1-1718400, AT&T, Waveform Selection mechanisms for DFTsOFDM, 3GPP TSG RAN WG1 #90bis, Aug. 21-25, 2017 (Year: 2017).*

*Primary Examiner* — Mahbubal Bar Chowdhury
(74) *Attorney, Agent, or Firm* — Holland & Hart LLP

(57) ABSTRACT

Methods, systems, and devices for wireless communications are described to switch between waveform configurations based on an indicated modulation coding scheme (MCS) such that waveform switching may be signaled implicitly. A base station may configure a user equipment (UE) with a hybrid MCS table including MCS indexes associated with a first waveform configuration and MCS indexes associated with a second waveform configuration. The base station may schedule resources for an uplink transmission for the UE and may indicate an MCS index associated with the uplink transmission, using index from the MCS table. The UE may select a waveform configuration for the uplink transmission based on the MCS index. For example, the UE may compare the MCS index with a threshold MCS index of the hybrid MCS table and determine a waveform configuration associated with the MCS index based on whether the MCS index falls above or below the threshold.

30 Claims, 15 Drawing Sheets

(51) Int. Cl.
*H04L 27/26* (2006.01)
*H04L 1/1812* (2023.01)

(58) Field of Classification Search
CPC ............ H04L 27/2607; H04L 27/2636; H04L 27/0008; H04L 27/2646
See application file for complete search history.

(56) References Cited

U.S. PATENT DOCUMENTS

| | | | |
|---|---|---|---|
| 2019/0253121 A1* | 8/2019 | Islam | H04B 7/0636 |
| 2019/0260623 A1* | 8/2019 | Li | H04L 27/2627 |
| 2020/0067630 A1* | 2/2020 | Chen | H04L 1/0003 |
| 2020/0127787 A1* | 4/2020 | Nory | H04L 27/2636 |
| 2020/0396730 A1* | 12/2020 | Kim | H04W 72/0413 |
| 2021/0105164 A1* | 4/2021 | Nakamura | H04L 27/2607 |
| 2021/0250970 A1* | 8/2021 | Ekpenyong | H04L 1/1887 |
| 2022/0167425 A1* | 5/2022 | Lei | H04L 5/0051 |

* cited by examiner

TECHNIQUES FOR INDICATING A WAVEFORM CONFIGURATION

CROSS REFERENCE

The present Application for Patent claims the benefit of U.S. Provisional Patent Application No. 63/092,376 by LEVITSKY et al., entitled "TECHNIQUES FOR INDICATING A WAVEFORM CONFIGURATION," filed Oct. 15, 2020, assigned to the assignee hereof, and expressly incorporated by reference herein.

FIELD OF TECHNOLOGY

The following relates to wireless communications, including techniques for implicitly indicating a waveform configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for implicitly indicating a waveform configuration. Generally, the described techniques provide for signaling, such as implicitly signaling, a switch between waveform configurations based on an indicated modulation coding scheme (MCS) for an uplink transmission. For example, a base station may configure a user equipment (UE) with an MCS table, where the MCS table may include MCS indexes that are associated with a first waveform configuration and MCS indexes that are associated with a second waveform configuration (e.g., a hybrid MCS table which includes indexes associated with multiple waveform configurations). The base station may schedule resources for the uplink transmission for the UE via a message, where the message may indicate an MCS index associated with (e.g., to be used for) the uplink transmission, which may represent an index from the MCS table (e.g., the hybrid MCS table). The MCS index indicated by the base station may therefore be associated with the first waveform configuration or associated with the second waveform configuration. The UE may receive the message including the resources for the uplink transmission and the MCS index associated with the uplink transmission, and may select a waveform configuration for the uplink transmission based on the MCS index.

For example, the UE may compare the MCS index with a threshold MCS index of the MCS table. If the MCS index is greater than the threshold MCS index, the UE may determine that the MCS index is associated with the first waveform configuration. If the MCS index is less than or equal to the threshold MCS index, the UE may determine that the MCS index is associated with the second waveform configuration. The UE may use the waveform configuration associated with the MCS index (e.g., a determined or selected waveform configuration such as the first waveform configuration or the second waveform configuration) for the uplink transmission.

A method for wireless communication at a user equipment (UE) is described. The method may include receiving, from a base station, an indication of a set of MCS indexes associated with both a first waveform configuration and a second waveform configuration, receiving, from the base station, an indication of resources for an uplink transmission and of a MCS index from the set of MCS indexes and associated with the uplink transmission, determining a waveform configuration from the first waveform configuration and the second waveform configuration based on the MCS index and a threshold MCS index, and transmitting the uplink transmission using the waveform configuration based on determining the waveform configuration.

An apparatus for wireless communication at a UE is described. The apparatus may include a processor, memory in electronic communication with the processor, and instructions stored in the memory. The instructions may be executable by the processor to cause the apparatus to receive, from a base station, an indication of a set of MCS indexes associated with both a first waveform configuration and a second waveform configuration, receive, from the base station, an indication of resources for an uplink transmission and of a MCS index from the set of MCS indexes and associated with the uplink transmission, determine a waveform configuration from the first waveform configuration and the second waveform configuration based on the MCS index and a threshold MCS index, and transmit the uplink transmission using the waveform configuration based on determining the waveform configuration.

Another apparatus for wireless communication at a UE is described. The apparatus may include means for receiving, from a base station, an indication of a set of MCS indexes associated with both a first waveform configuration and a second waveform configuration, means for receiving, from the base station, an indication of resources for an uplink transmission and of a MCS index from the set of MCS indexes and associated with the uplink transmission, means for determining a waveform configuration from the first waveform configuration and the second waveform configuration based on the MCS index and a threshold MCS index, and means for transmitting the uplink transmission using the waveform configuration based on determining the waveform configuration.

A non-transitory computer-readable medium storing code for wireless communication at a UE is described. The code may include instructions executable by a processor to receive, from a base station, an indication of a set of MCS indexes associated with both a first waveform configuration and a second waveform configuration, receive, from the base station, an indication of resources for an uplink transmission and of a MCS index from the set of MCS indexes and associated with the uplink transmission, determine a waveform configuration from the first waveform configuration and the second waveform configuration based on the MCS index and a threshold MCS index, and transmit the uplink transmission using the waveform configuration based on determining the waveform configuration.

Some examples of the method, apparatuses, and non-transitory computer-readable medium described herein may further include operations, features, means, or instructions for comparing the MCS index to the threshold MCS index, where determining the waveform configuration may be based on comparing the MCS index to the threshold MCS index.

Some examples of the method, apparatuses, and non-transitory computer-readable medium described herein may further include operations, features, means, or instructions for determining that the MCS index may be greater than the threshold MCS index based on comparing the MCS index to the threshold MCS index, where determining the waveform configuration includes determining the first waveform configuration based on the MCS index being greater than the threshold MCS index.

Some examples of the method, apparatuses, and non-transitory computer-readable medium described herein may further include operations, features, means, or instructions for determining that the MCS index may be less than or equal to the threshold MCS index based on comparing the MCS index to the threshold MCS index, where determining the waveform configuration includes determining the second waveform configuration based on the MCS index being less than or equal to the threshold MCS index.

Some examples of the method, apparatuses, and non-transitory computer-readable medium described herein may further include operations, features, means, or instructions for receiving an indication of the threshold MCS index, where determining the waveform configuration may be based on receiving the indication of the threshold MCS index.

Some examples of the method, apparatuses, and non-transitory computer-readable medium described herein may further include operations, features, means, or instructions for transmitting, before receiving the indication of the resources, one or more uplink transmissions and determining that the waveform configuration may be different than a third waveform configuration used for the one or more uplink transmissions, where transmitting the uplink transmission may be based on determining that the waveform configuration may be different than the third waveform configuration.

Some examples of the method, apparatuses, and non-transitory computer-readable medium described herein may further include operations, features, means, or instructions for identifying, based on signaling received from the base station and determining that the waveform configuration may be different than the third waveform configuration, a first duration between the indication of the resources and the uplink transmission, where transmitting the uplink transmission may be based on identifying the first duration.

Some examples of the method, apparatuses, and non-transitory computer-readable medium described herein may further include operations, features, means, or instructions for performing a respective retransmission for one or more active hybrid automatic repeat request processes associated with the one or more uplink transmissions using the third waveform configuration.

In some examples of the method, apparatuses, and non-transitory computer-readable medium described herein, the indication of the resources indicates one or more configured uplink transmissions or indicates a scheduled uplink transmission.

In some examples of the method, apparatuses, and non-transitory computer-readable medium described herein, MCS indexes of the set of MCS indexes corresponding to the first waveform configuration may be greater than the threshold MCS index and MCS indexes of the set of MCS indexes corresponding to the second waveform configuration may be less than or equal to the threshold MCS index.

In some examples of the method, apparatuses, and non-transitory computer-readable medium described herein, the MCS index may be based on a level of a SNR associated with uplink communications from the UE.

In some examples of the method, apparatuses, and non-transitory computer-readable medium described herein, the first waveform configuration includes a CP-OFDM waveform and the second waveform configuration includes a DFT-S-OFDM waveform.

Some examples of the method, apparatuses, and non-transitory computer-readable medium described herein may further include operations, features, means, or instructions for determining that the MCS index corresponds to a subset of MCS indexes of the set of MCS indexes, the subset of MCS indexes associated with the second waveform configuration and with uplink transmissions having two or more transmission layers and transmitting the uplink transmission using the second waveform configuration and with two or more transmission layers based on the MCS index corresponding to the subset of MCS indexes.

Some examples of the method, apparatuses, and non-transitory computer-readable medium described herein may further include operations, features, means, or instructions for receiving, from the base station, an indication of a number of transmission layers for the uplink transmission and transmitting the uplink transmission using the second waveform configuration and with two or more transmission layers based on the indication of the number of transmission layers.

A method for wireless communication at a base station is described. The method may include transmitting, to a UE, an indication of a set of MCS indexes associated with both of a first waveform configuration and a second waveform configuration, transmitting, to the UE, an indication of resources for an uplink transmission and of a MCS index from the set of MCS indexes and associated with the uplink transmission, and receiving the uplink transmission using a waveform configuration including the first waveform configuration or the second waveform configuration, the waveform configuration based on the MCS index and a threshold MCS index.

An apparatus for wireless communication at a base station is described. The apparatus may include a processor, memory in electronic communication with the processor, and instructions stored in the memory. The instructions may be executable by the processor to cause the apparatus to transmit, to a UE, an indication of a set of MCS indexes associated with both of a first waveform configuration and a second waveform configuration, transmit, to the UE, an indication of resources for an uplink transmission and of a MCS index from the set of MCS indexes and associated with the uplink transmission, and receive the uplink transmission using a waveform configuration including the first waveform configuration or the second waveform configuration, the waveform configuration based on the MCS index and a threshold MCS index.

Another apparatus for wireless communication at a base station is described. The apparatus may include means for transmitting, to a UE, an indication of a set of MCS indexes associated with both of a first waveform configuration and a second waveform configuration, means for transmitting, to the UE, an indication of resources for an uplink transmission and of a MCS index from the set of MCS indexes and associated with the uplink transmission, and means for receiving the uplink transmission using a waveform configuration including the first waveform configuration or the second waveform configuration, the waveform configuration based on the MCS index and a threshold MCS index.

A non-transitory computer-readable medium storing code for wireless communication at a base station is described. The code may include instructions executable by a processor to transmit, to a UE, an indication of a set of MCS indexes associated with both of a first waveform configuration and a second waveform configuration, transmit, to the UE, an indication of resources for an uplink transmission and of a MCS index from the set of MCS indexes and associated with the uplink transmission, and receive the uplink transmission using a waveform configuration including the first waveform configuration or the second waveform configuration, the waveform configuration based on the MCS index and a threshold MCS index.

In some examples of the method, apparatuses, and non-transitory computer-readable medium described herein, the waveform configuration includes the first waveform configuration based on the MCS index being greater than the threshold MCS index.

In some examples of the method, apparatuses, and non-transitory computer-readable medium described herein, the waveform configuration includes the second waveform configuration based on the MCS index being less than or equal to the threshold MCS index.

Some examples of the method, apparatuses, and non-transitory computer-readable medium described herein may further include operations, features, means, or instructions for transmitting an indication of the threshold MCS index, where the waveform configuration may be based on the indication of the threshold MCS index.

In some examples of the method, apparatuses, and non-transitory computer-readable medium described herein, scheduling, before transmitting the indication of the resources, one or more uplink transmissions associated with a third waveform configuration and determining that the waveform configuration may be different than the third waveform configuration, where receiving the uplink transmission may be based on determining that the waveform configuration may be different than the third waveform configuration.

Some examples of the method, apparatuses, and non-transitory computer-readable medium described herein may further include operations, features, means, or instructions for identifying, based on determining that the waveform configuration may be different than the third waveform configuration, a first duration between the indication of the resources and the uplink transmission, where receiving the uplink transmission may be based on identifying the first duration.

Some examples of the method, apparatuses, and non-transitory computer-readable medium described herein may further include operations, features, means, or instructions for determining one or more active hybrid automatic repeat request processes associated with the one or more uplink transmissions based on the waveform configuration being different than the third waveform configuration and terminating the one or more active hybrid automatic repeat request processes based on the waveform configuration being different than the third waveform configuration.

Some examples of the method, apparatuses, and non-transitory computer-readable medium described herein may further include operations, features, means, or instructions for receiving a respective retransmission for one or more active hybrid automatic repeat request processes associated with the one or more uplink transmissions using the third waveform configuration.

In some examples of the method, apparatuses, and non-transitory computer-readable medium described herein, the indication of the resources indicates one or more configured uplink transmissions or indicates a scheduled uplink transmission.

In some examples of the method, apparatuses, and non-transitory computer-readable medium described herein, MCS indexes of the set of MCS indexes corresponding to the first waveform configuration may be greater than the threshold MCS index and MCS indexes of the set of MCS indexes corresponding to the second waveform configuration may be less than or equal to the threshold MCS index.

In some examples of the method, apparatuses, and non-transitory computer-readable medium described herein, the waveform configuration may be based on a level of a SNR for communications associated with the UE.

In some examples of the method, apparatuses, and non-transitory computer-readable medium described herein, the first waveform configuration includes a CP-OFDM waveform and the second waveform configuration includes a DFT-S-OFDM waveform.

Some examples of the method, apparatuses, and non-transitory computer-readable medium described herein may further include operations, features, means, or instructions for determining the MCS index from a subset of MCS indexes of the set of MCS indexes, the subset of MCS indexes associated with the second waveform configuration and with uplink transmissions having two or more transmission layers and receiving the uplink transmission using the second waveform configuration and with two or more transmission layers based on determining the MCS index corresponding to the subset of MCS indexes.

Some examples of the method, apparatuses, and non-transitory computer-readable medium described herein may further include operations, features, means, or instructions for transmitting, to the UE, an indication of a number of transmission layers for the uplink transmission and receiving the uplink transmission using the second waveform configuration and with two or more transmission layers based on the indication of the number of transmission layers.

DETAILED DESCRIPTION

Figure 1:
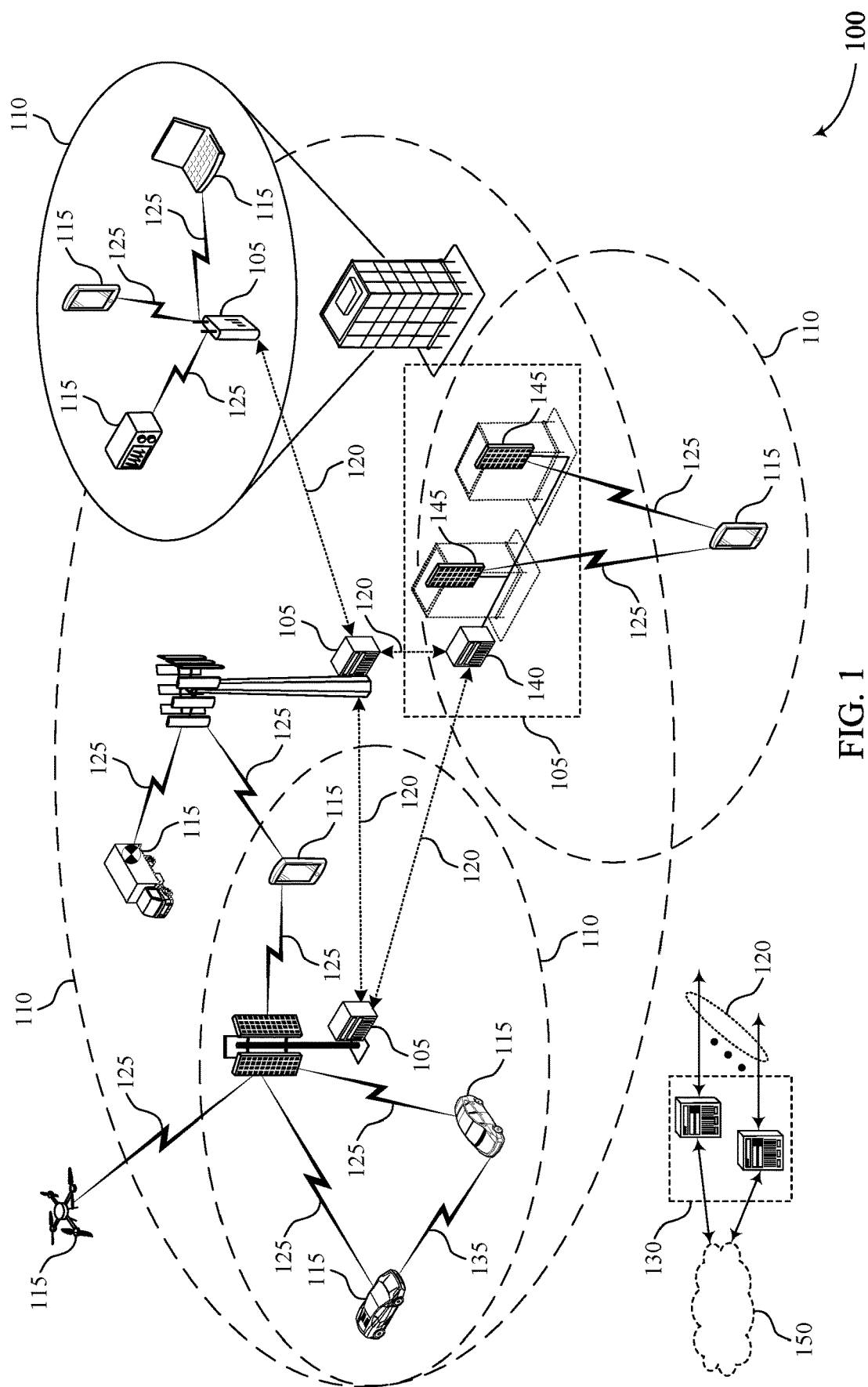
FIG. 1 illustrates an example of a wireless communications system that supports techniques for implicitly indicating a waveform configuration in accordance with aspects of the present disclosure.

A base station and a user equipment (UE) may be configured to communicate uplink transmissions using one waveform configuration of a set of waveform configurations (e.g., a set of two or more waveform configurations). For example, the UE may use a first waveform configuration that supports a more spectrally efficient transmission (e.g., in comparison to some other waveforms) when communications may be associated with channel and reception conditions (e.g., a signal to noise ratio (SNR) greater than a threshold) that support the more spectrally efficient transmission. The UE may use a second waveform configuration to increase communication quality, for example, when communications may be associated with channel and reception conditions (e.g., an SNR less than a threshold) for which a lower spectral efficiency for transmissions may result in a higher communication quality. The UE may experience different communication conditions (e.g., channel conditions or SNR conditions) at different times, at different locations, or on different channels, among other examples.

In some cases, a waveform configuration used by the UE may fail to match communication conditions at the UE. For example, the UE may communicate using the first waveform configuration and may experience a decrease in communication quality (e.g., due to movement, for example, when approaching a cell edge). Additionally or alternatively, the UE may communicate using the second waveform configuration and may experience an increase in communication quality, which may result in lower efficiency (e.g., based on using the second waveform configuration, which may be limited to a single layer of transmission and which may be associated with MCS values having a lower spectral efficiency). In such cases, the base station may reconfigure the UE to use a different waveform configuration. Reconfiguring the waveform configuration may include nonsynchronous signaling (e.g., radio resource control (RRC) signaling), which may involve a higher latency for reconfiguration.

During a reconfiguration period, the base station may be uncertain as to which waveform configuration is being used by the UE. Accordingly, changing or switching between waveform configurations may introduce some link interruption for communications between the UE and the base station, which may reduce communication quality. Based on the higher latency for waveform reconfiguration, in some cases the base station may refrain from changing the waveform while communicating with the UE (e.g., changing the waveform "on the fly"). The base station may instead perform waveform selection for the UE during an initial UE configuration when the UE is connecting to the wireless network (e.g., may perform waveform selection in advance).

The present disclosure provides techniques for implicitly signaling a switch between waveform configurations based on an indicated modulation coding scheme (MCS) for an uplink transmission. For example, the base station may configure the UE with an MCS table, where the MCS table may include MCS indexes that are associated with the first waveform configuration and MCS indexes that are associated with the second waveform configuration (e.g., a hybrid MCS table). The base station may schedule resources for the uplink transmission for the UE via a message, where the message may additionally indicate an MCS index associated with (e.g., to be used for) the uplink transmission and representing an index from the MCS table. The MCS index indicated by the base station may therefore be associated with the first waveform configuration or associated with the second waveform configuration. The UE may receive the message including the resources for the uplink transmission and the MCS index associated with the uplink transmission and may select a waveform configuration for the uplink transmission based on the MCS index.

For example, the UE may compare the MCS index with a threshold MCS index of the MCS table. If the MCS index is greater than the threshold MCS index, the UE may determine that the MCS index is associated with the first waveform configuration. If the MCS index is less than or equal to the threshold MCS index, the UE may determine that the MCS index is associated with the second waveform configuration. The UE may use the waveform configuration associated with the MCS index for the uplink transmission. In some cases, the base station may select the MCS for the uplink transmission, for example, based on a communication quality or communication scenario for the UE and the waveform configuration associated with the selected MCS may increase communication quality for the communications of the UE (e.g., compared to a waveform configuration configured in advance).

Implicitly signaling a waveform configuration based on an MCS index for an uplink transmission may support waveform switching (e.g., synchronous waveform switching) with a lower reconfiguration latency, which may support adaptive waveform switching (e.g., adaptive to reception or communication conditions) and may further support an increase in uplink communication quality between the UE and the base station. For example, a duration for switching waveform configurations may be reduced and the base station and the UE may readily adapt to changing wireless conditions using the implicit indication.

Aspects of the disclosure are initially described in the context of wireless communications systems. Aspects of the disclosure are further illustrated by and described with reference to a process flow, apparatus diagrams, system diagrams, and flowcharts that relate to techniques for implicitly indicating a waveform configuration.

FIG. 1 illustrates an example of a wireless communications system 100 that supports techniques for implicitly indicating a waveform configuration in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 and a UE 115 may be configured to communicate uplink transmissions using one of a set of waveform configurations (e.g., a set of two waveform configurations). For example, the UE 115 may use a first waveform configuration (e.g., cyclic prefix OFDM (CP-OFDM) waveform) for more spectrally efficient transmissions (e.g., in comparison to other waveforms), when communications may be associated with channel and reception conditions that support a higher communication efficiency. The UE 115 may use a second waveform configuration (e.g., DFT-S-OFDM) to increase communication reliability or quality, for example, when communications may be associated with lower channel and reception conditions that may support a lower communication quality or efficiency. The UE 115 may experience different channel and reception conditions at different times, at different locations, or on different channels, among other examples.

The base station 105 may configure the UE 115 with an MCS table, where the MCS table may include MCS indexes that are associated with the first waveform configuration and MCS indexes that are associated with the second waveform configuration (e.g., a hybrid MCS table). The base station 105 may schedule resources for an uplink transmission for the UE 115 via a message, where the message may indicate an MCS index associated with (e.g., to be used for) the uplink transmission and representing an index from the MCS table. The MCS index indicated by the base station 105 may be associated with the first waveform configuration or associated with the second waveform configuration. The UE 115 may receive the message including the resources for the uplink transmission and the MCS index associated with the uplink transmission, and may select a waveform configuration for the uplink transmission based on the MCS index. The UE 115 may then communicate with the base station 105, for example transmitting the uplink transmission, using the selected waveform configuration.

Figure 2:
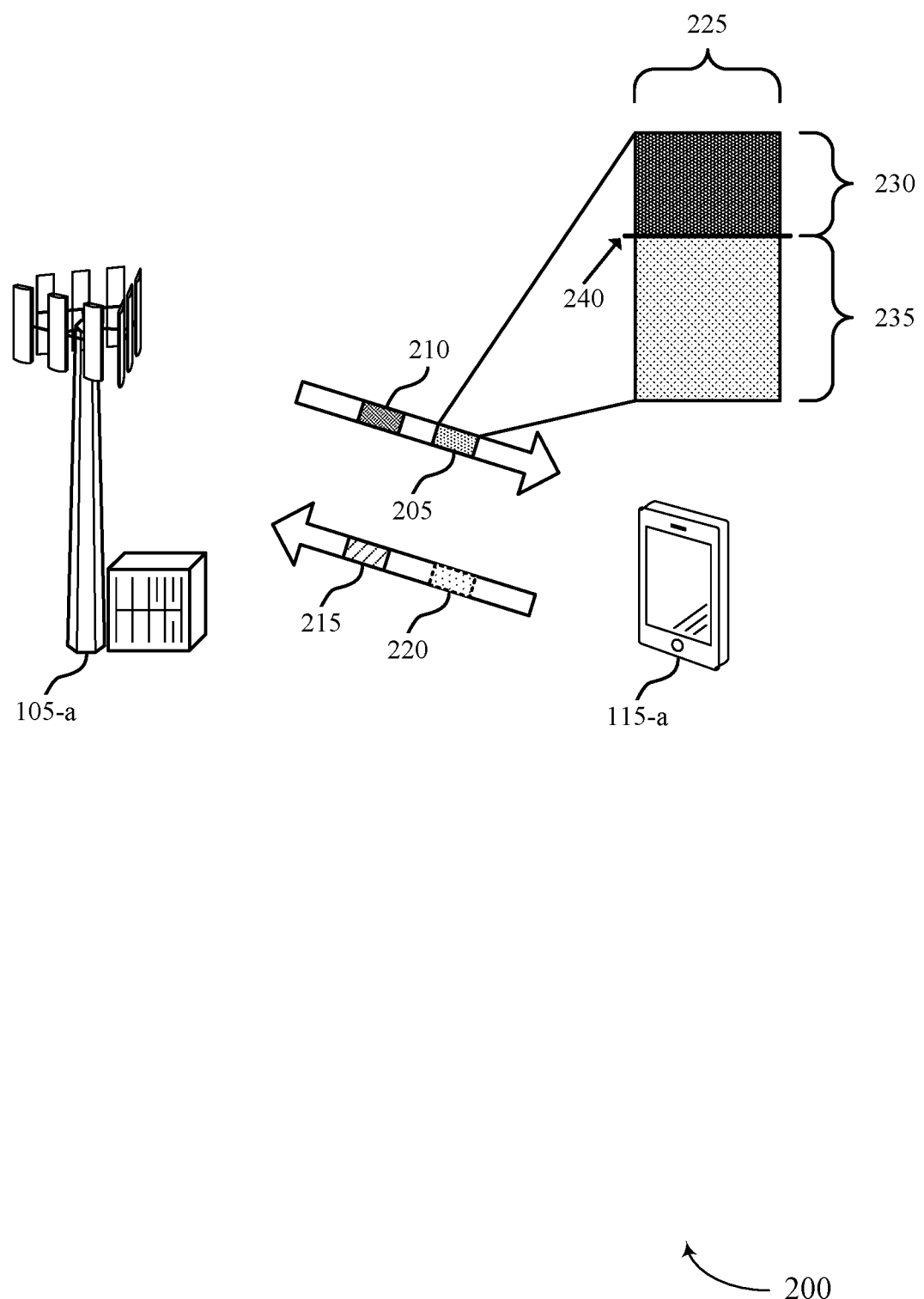
FIG. 2 illustrates an example of a wireless communications system that supports techniques for implicitly indicating a waveform configuration in accordance with aspects of the present disclosure.

FIG. 2 illustrates an example of a wireless communications system 200 that supports techniques for implicitly indicating a waveform configuration in accordance with aspects of the present disclosure. In some examples, wireless communications system 200 may implement aspects of wireless communications system 100. For example, wireless communications system 200 may include a base station 105-a and a UE 115-a, which may represent examples of a base station 105 and a UE 115 described with reference to FIG. 1. Base station 105-a and UE 115-a may be configured to communicate uplink transmissions using one of a set of waveform configurations (e.g., a set of two waveform configurations). For example, base station 105-a and UE 115-a may be configured to communicate using a DFT-S-OFDM waveform or a CP-OFDM waveform, among other examples.

In some examples, UE 115-a may use a DFT-S-OFDM waveform in some situations based on one or more conditions, such as when UE 115-a is located on an edge of a cell of base station 105-a (e.g., an edge of a geographic coverage area 110, as described with reference to FIG. 1), or in other situations with relatively lower communication conditions or channel quality (e.g., an indoor environment or signal blockage). For example, the DFT-S-OFDM waveform may have a lower peak to average power (PAPR) characteristic (e.g., in comparison to other waveforms), which PAPR characteristic may support an increase transmission power (e.g., from the cell edge). This waveform configuration may also be associated with some MCS options for lower code rates and/or lower modulation (e.g., a lower π/2 binary phase shift keying (BPSK) modulation). The waveform configuration for DFT-S-OFDM may be associated with single layer transmissions, for example, because the waveform configuration may not be intended for higher signal to noise ratio (SNR) regions (e.g., higher communication channel quality) or higher spectral efficiencies. The DFT-S-OFDM waveform configuration may also be associated with coverage enhancement (e.g., from the cell edge or other low SNR scenarios).

In some examples, UE 115-a may use a CP-OFDM waveform for more spectrally efficient transmissions (e.g., in comparison to other waveforms). For example, the CP-OFDM waveform may be associated with MCSs (e.g., MCS tables) that represent more spectrally efficient MCSs and CP-OFDM may also support multiple layers for a transmission. A CP-OFDM waveform configuration may be associated with transmissions from UE 115-a if UE 115-a is under cell coverage of base station 105-a (e.g., may be associated with a majority of transmissions under cell coverage), or in other situations with higher communication channel quality (e.g., an outdoor environment or an environment with lower signal blockage).

UE 115-a may experience mobility (e.g., low or moderate mobility), for example, based on a movement of a user or a vehicle, among other examples. As such, UE 115-a may be located at different locations under the cell coverage range of base station 105-a at different times. For example, at a first time UE 115-a may be located at an edge of cell coverage (e.g., an edge of a geographic coverage area 110), and at a second time UE 115-a may be located within the cell coverage. As UE 115-a moves within different cell coverage situations, or as a communication scenario otherwise changes, transmission or reception conditions at UE 115-a may change. The transmission or reception conditions may be represented, in some cases, by a communication link quality (e.g., an SNR). For example, a lower SNR may be associated with communications from a cell edge or other lower channel quality communications and a middle range or higher SNR may be associated with a UE location under a higher or greater (e.g., better) cell coverage.

Accordingly, in some cases, a waveform configuration used by UE 115-a may fail to match communication conditions at UE 115-a. For example, UE 115-a may move from a higher cell coverage area to a cell edge while communicating with a CP-OFDM configuration (e.g., based on an initial location with a greater cell coverage), which may result in lower communication quality (e.g., reliability) and may also reduce a cell coverage range for UE 115-a. Additionally or alternatively, UE 115-a may move from a cell edge into a higher cell coverage area while communicating with a DFT-S-OFDM configuration (e.g., based on an initial location at a cell edge), which may result in a lower link efficiency.

In one example, switching from a CP-OFDM configuration to a DFT-S-OFDM configuration (e.g., enabling transform precoding), or switching from a DFT-S-OFDM configuration back to a CP-OFDM configuration, may be based on reconfiguration of one or more communication parameters (e.g., waveform configuration parameters). For example, base station 105-a may change a waveform configuration for UE 115-a via configuration signaling (e.g., radio resource control (RRC) signaling). The configuration signaling may indicate one or more parameters for enabling or disabling different waveform configurations (e.g., enabling or disabling transform precoding) for uplink scheduling (e.g., physical uplink shared channel (PUSCH) scheduling).

For example, the configuration signaling from the base station 105-a may include a first parameter (e.g., a transformPrecoder parameter in pusch-Config) for transform precoding for an uplink transmission scheduled by a scheduling grant (e.g., carried by a downlink control information (DCI) format 0_1). The configuration signaling may additionally or alternatively include a second parameter (e.g., a transformPrecoder parameter in configuredGrantConfig) for an uplink transmission associated with a configured grant. In some cases, the configuration signaling may include a third parameter (e.g., a msg3-transformPrecoder parameter) for an uplink transmission scheduled by a random access response scheduling grant, a scheduling grant scheduled by one or more DCI formats (e.g., a DCI format 0_0), or for any other scheduled or configured grant for an uplink transmission (e.g., if a transformPrecoder parameter is not configured under pusch-Config or configuredGrantConfig). In some cases, the configuration signaling may include a fourth parameter for an uplink transmission associated with a two-step random access procedure.

Reconfiguring the waveform configuration via configuration signaling may include nonsynchronous signaling that may involve relatively long periods of latency for reconfiguration (e.g., several hundred milliseconds). During reconfiguration (e.g., after signaling the reconfiguration), base station 105-a may not be informed as to which waveform configuration is being used by UE 115-a. Accordingly, changing or switching between waveform configurations may introduce some link interruption for communications between UE 115-a and base station 105-a. The link interruption may reduce communication quality, for example, especially if UE 115-*a* is approaching a cell edge of base station 105-*a* or otherwise experiencing a lower communication quality. In some cases, some networks may refrain from using some waveform configurations (e.g., a DFT-S-OFDM configuration) in order to reduce link interruption.

Refraining from using one or more waveform configurations may reduce communication quality or link efficiency, for example, in some communication scenarios that may be associated with (e.g., configured for) the one or more waveform configurations. In cases where switching between waveform configurations is supported (e.g., via reconfiguration signaling), such switching may introduce latency, increase signaling overhead, and/or result in link interruption.

The present disclosure provides techniques for signaling, such as implicitly signaling, a switch between waveform configurations (e.g., between CP-OFDM and DFT-S-OFDM) based on an indicated MCS for an uplink transmission 215. For example, base station 105-*a* may configure UE 115-*a* with an MCS table 225 (e.g., a hybrid MCS table), via configuration signaling 205, where the MCS table 225 may include MCS indexes 235 that are associated with a first waveform configuration (e.g., CP-OFDM) and MCS indexes 230 that are associated with a second waveform configuration (e.g., DFT-S-OFDM). MCS indexes 230 may represent a lowest set of MCS indexes (e.g., a lowest N MCS indexes) and MCS indexes 235 may represent a remaining set of MCS indexes (e.g., a remaining 28–N MCS indexes, assuming a total of 28 MCS indexes). The MCS indexes of MCS table 225 may range from an MCS index of 0 to an MCS index of 27, among other examples.

The configuration signaling 205 may be based on establishing a connection between UE 115-*a* and base station 105-*a* and may include one or more parameters indicating the MCS table 225 (e.g., an mcs-Table parameter or an mcs-TableTransformPrecoding parameter). In some cases, the configuration signaling may indicate the MCS table 225 using an index (e.g., a configuration index) associated with a defined table (e.g., defined by a wireless communications standard and for example stored at base station 105-*a*, UE 115-*a*, or both).

The MCS table 225 (e.g., a hybrid MCS table configured for multiple waveform configurations) may be different from other MCS tables that may be configured for one waveform configuration. For example, when implicit switching is not supported, UE 115-*a* may be configured with a first MCS table for the first waveform configuration (e.g., CP-OFDM configuration) and a second MCS table for the second waveform configuration (e.g., DFT-S-OFDM configuration). UE 115-*a* may use the first MCS table for CP-OFDM based transmissions (e.g., if transform precoding is disabled) and may use the second MCS table for DFT-S-OFDM based transmissions (e.g., if transform precoding is enabled), where the type of transmission may be indicated, for example, by the one or more RRC parameters described herein.

The MCS table 225 (e.g., the hybrid MCS table) may include first values (e.g., MCS indexes and corresponding parameters) based on or from one or more first tables associated with the first waveform configuration (e.g., from three tables configured for CP-OFDM). The MCS table 225 may also include second values (e.g., MCS indexes and corresponding parameters) based on or from one or more second tables associated with the second waveform configuration (e.g., from two tables configured for DFT-S-OFDM). For example, MCS indexes 230 may include or be associated with the second values and MCS indexes 235 may include or be associated with the first values. The first values may include any subset of values from the one or more first tables and the second values may include any subset of values from the one or more second tables. The first values and second values may represent MCS indexes and a set of parameters associated with each MCS index, where the associated parameters may include, among other examples, a modulation order, a code rate (e.g., a target code rate), and a spectral efficiency.

In some cases, the first values and the second values may represent continuous MCS indexes from the respective table(s) and in some cases, the first values and the second values may represent non-continuous values from the respective table(s) (e.g., every Xth value). The first values and the second values may together or separately include a continuous range of spectral efficiencies, such that the first values and/or the second values may cover a span of spectral efficiencies (e.g., and associated code rates). The first values and the second values may both be associated with one modulation order (e.g., a quadrature phase shift keying (QPSK) modulation order) or may be associated with any quantity of modulation orders (e.g., the first values, the second values, or both, may be associated with one or more different modulation orders).

In some cases, the MCS table 225 may be defined or selected by base station 105-*a* using the one or more first tables and the one or more second tables, and in some cases, the MCS table 225 may be defined by a wireless communications standard (e.g., and stored at base station 105-*a*, UE 115-*a*, or both).

Base station 105-*a* may schedule resources for the uplink transmission 215 for UE 115-*a* via message 210, which may represent control information (e.g., a DCI for a grant-based uplink transmission 215) or configuration information (e.g., for a configured grant uplink transmission 215). The message 210 may additionally indicate an MCS index associated with (e.g., to be used for) the uplink transmission 215, where the MCS index may represent an index from the MCS table 225 (e.g., from one of the MCS indexes 230 or 235). The MCS index indicated by base station 105-*a* may therefore be associated with the first waveform configuration (e.g., if the MCS index is from MCS indexes 235) or associated with the second waveform configuration (e.g., if the MCS index is from MCS indexes 230). UE 115-*a* may receive the message 210 including the resources for the uplink transmission 215 and the MCS index associated with the uplink transmission and may select a waveform configuration for the uplink transmission based on the MCS index.

For example, UE 115-*a* may compare the MCS index with a threshold MCS index 240 of the MCS table 225. If the MCS index is greater than the threshold MCS index 240, UE 115-*a* may determine that the MCS index is associated with the first waveform configuration (e.g., based on the MCS index being one of the MCS indexes 235). If the MCS index is less than or equal to the threshold MCS index 240, UE 115-*a* may determine that the MCS index is associated with the second waveform configuration (e.g., based on the MCS index being one of the MCS indexes 230). UE 115-*a* may use the waveform configuration associated with the MCS index (e.g., a determined or selected waveform configuration) for the uplink transmission 215. In some cases, the threshold MCS index 240 may be indicated by base station 105-*a* via configuration signaling (e.g., base station 105-*a* may determine or select the threshold MCS index 240), and in some cases, the threshold MCS index 240 may be defined by a wireless communications standard (e.g., and stored at base station 105-*a*, UE 115-*a*, or both).

In some cases, base station 105-*a* may select an MCS for the uplink transmission 215, for example, based on a communication channel quality or communication scenario for UE 115-*a* and the waveform associated with the selected MCS may increase a communication quality efficiency or reliability for UE 115-*a* (e.g., compared to a waveform semi-statically configured in advance).

In some cases, if the MCS index indicates for UE 115-*a* to switch waveform configurations, UE 115-*a* and base station 105-*a* may identify a time period between message 210 and uplink transmission 215, for example, based on a parameter (e.g., a control parameter, such as a K2 parameter) indicated by base station 105-*a* to UE 115-*a*. The time period may, for example, be configured to support switching waveforms at UE 115-*a* for the uplink transmission 215. In some examples, if the MCS index indicates for UE 115-*a* to switch waveform configurations, base station 105-*a* may stop or terminate one or more active HARQ processes 220 associated with the previous waveform. In some other examples, if the MCS index indicates for UE 115-*a* to switch waveform configurations, base station 105-*a* and UE 115-*a* may maintain one or more active HARQ processes 220 associated with the previous waveform, and may use the previous waveform for one or more retransmissions associated with these HARQ processes 220.

In some cases, the second waveform configuration (e.g., DFT-S-OFDM configuration) may be indicated for the uplink transmission 215, and the uplink transmission 215 may be associated with more than one layer (e.g., two or more layers), for example, based on support of multi-layer transmissions by any MCS index or a subset of MCS indexes (e.g., associated with a DFT-S-OFDM waveform) from the MCS table 225. For example, a subset of MCS indexes 230 may be associated with more than one transmission layer (e.g., with two or more transmission layers). A multi-layer transmission by any MCS index or a subset of MCS indexes of the MCS table 225 may be supported when multiple transmission layers with a DFT-S-OFDM waveform are supported by the wireless communications system. If the MCS index indicated by base station 105-*a* is included in the subset of MCS indexes 230 (e.g., as determined by base station 105-*a*), UE 115-*a* may identify that the uplink transmission 215 may be configured with two or more layers and may transmit the uplink transmission 215 using the two or more layers.

In some cases, a modulation scheme (e.g., π/2 BPSK modulation) may be enabled for MCS indexes 230 (e.g., associated with the second waveform configuration or DFT-S-OFDM) based on a configuration parameter (e.g., a tp-pi2BPSK parameter) indicated by base station 105-*a*.

Figure 3:
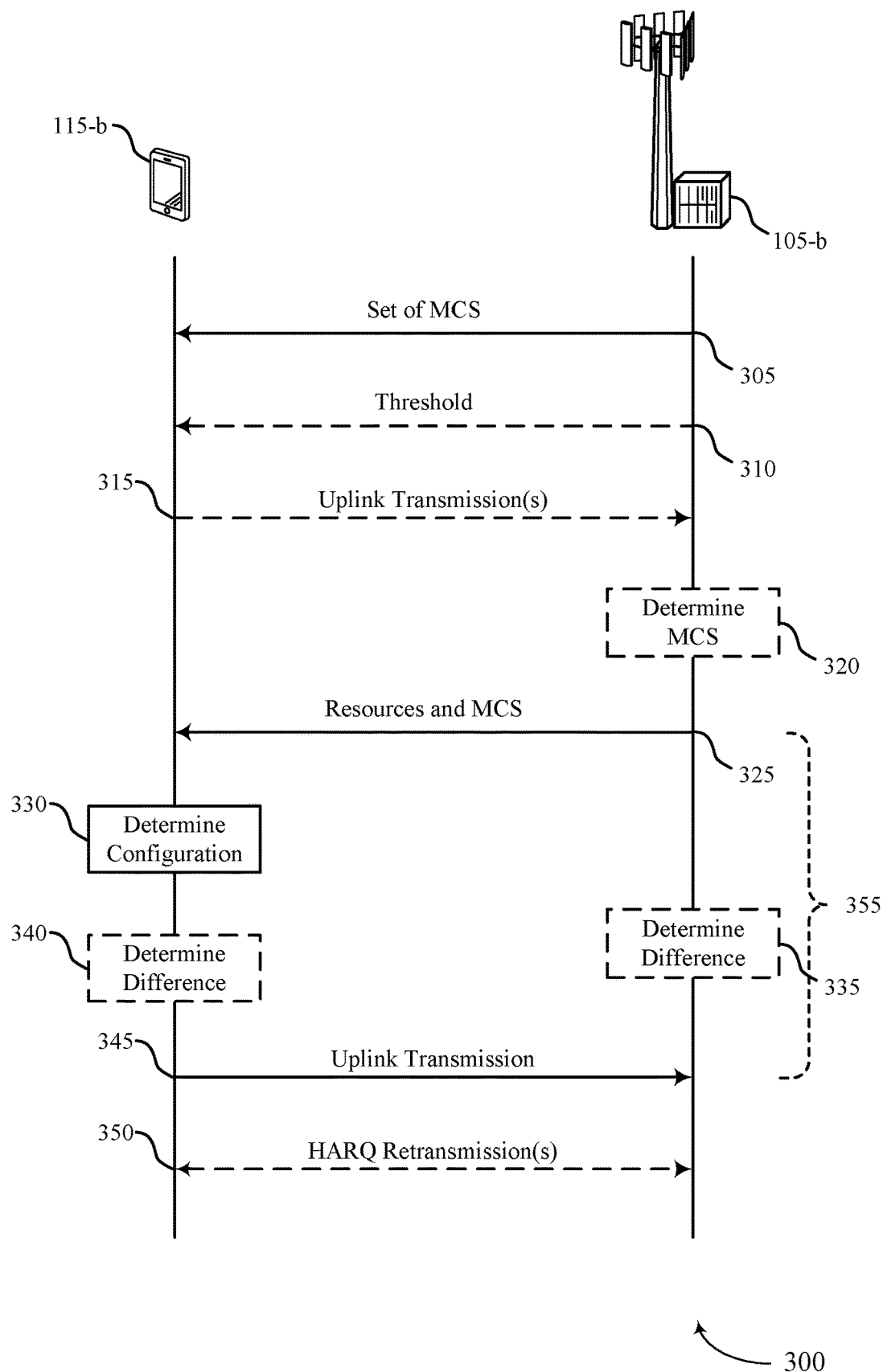
FIG. 3 illustrates an example of a process flow that supports techniques for implicitly indicating a waveform configuration in accordance with aspects of the present disclosure.

FIG. 3 illustrates an example of a process flow 300 that supports techniques for implicitly indicating a waveform configuration in accordance with aspects of the present disclosure. In some examples, process flow 300 may implement or be implemented by aspects of wireless communications system 100 or 200. Process flow 300 may be implemented by a UE 115-*b* and a base station 105-*b*, which may represent examples of a UE 115 and a base station 105 as described with reference to FIGS. 1 and 2. Process flow 300 may be implemented by UE 115-*b* and base station 105-*b*, for example, to change a waveform configuration based on an indicated MCS index, as described with reference to FIG. 2.

In the following description of process flow 300, the operations between UE 115-*b* and base station 105-*b* may be transmitted in a different order than the order shown, or the operations performed by UE 115-*b* and base station 105-*b* may be performed in different orders or at different times. For example, specific operations may also be left out of process flow 300, or other operations may be added to process flow 300. Although UE 115-*b* and base station 105-*b* are shown performing the operations of process flow 300, some aspects of some operations may also be performed by one or more other wireless devices.

At 305, base station 105-*b* may transmit, to UE 115-*b*, an indication of a set of MCS indexes associated with both a first waveform configuration (e.g., CP-OFDM configuration) and a second waveform configuration (DFT-S-OFDM configuration). As described with reference to FIG. 2, the set of MCS indexes may represent or include an MCS table, such as a hybrid MCS table configured for multiple waveform configurations. Base station 105-*b* may transmit the indication of the set of MCS indexes via configuration signaling (e.g., RRC signaling), for example, during or after establishing a connection with UE 115-*b*. For example, base station 105-*b* may transmit a parameter indicating for UE 115-*b* to use the hybrid MCS table (e.g., by setting an mcs-Table parameter to hybrid).

At 310, in some cases, base station 105-*b* may transmit an indication of a threshold MCS index to UE 115-*b*. For example, base station 105-*b* may transmit the indication of the threshold MCS index to UE 115-*b* via configuration signaling, and in some cases, via a same transmission as the indication of the set of MCS indexes. The threshold MCS index may represent a threshold between a first set of MCS indexes associated with the first waveform configuration and a second set of MCS indexes associated with the second waveform configuration. In some cases, the threshold MCS index may be determined or selected by base station 105-*b*. In some cases, the threshold MCS index may not be signaled (e.g., or determined) by base station 105-*b* and may be specified by a standard (e.g., a wireless communications standard) and stored at base station 105-*b*, UE 115-*b*, or both.

At 315, in some cases, UE 115-*b* may transmit one or more uplink transmissions to base station 105-*b*, for example, using a third waveform configuration that includes either the first waveform configuration or the second waveform configuration, among other examples. For example, UE 115-*b* may transmit the one or more uplink transmissions using a CP-OFDM configuration (e.g., based on an RRC configuration or an MCS index indicated by base station 105-*b*) because communications from UE 115-*b* (e.g., an uplink link) may have a higher or middle range quality (e.g., higher or middle range SNR). The one or more uplink transmissions may each be associated with a corresponding HARQ process (e.g., HARQ retransmission), where base station 105-*b* may request retransmission and UE 115-*b* may retransmit information associated with the one or more uplink transmissions.

At 320, in some cases, base station 105-*b* may determine or select an MCS associated with a waveform configuration for an uplink transmission from UE 115-*b*. For example, base station 105-*b* may select the MCS associated with the waveform configuration from the first waveform configuration and the second waveform configuration. Base station 105-*b* may select the MCS (e.g., and the waveform configuration implicitly associated with the MCS) based on channel or communication conditions (e.g., a communication channel quality, such as SNR) for transmissions of UE 115-*b*. For example, base station 105-*b* may select a relatively high MCS index associated with a CP-OFDM configuration if communications from UE 115-*b* are associated with a higher communication channel quality (e.g., a higher SNR, such as within cell coverage) and may select a relatively low MCS index associated with a DFT-S-OFDM configuration if communications from UE 115-*b* are associated with a lower communication channel quality (e.g., a lower SNR, such as on a cell edge).

In a first example, UE 115-*b* may be associated with a lower communication channel quality on the uplink link (e.g., lower SNR conditions, such as when the UE 115-*b* is near or on a cell edge) and base station 105-*b* may select a lower MCS index associated with a DFT-S-OFDM configuration (e.g., may implicitly switch from a CP-OFDM configuration to a DFT-S-OFDM configuration) for the uplink transmission based on the lower communication quality (e.g., the relatively poor channel and reception conditions). In a second example, UE 115-*b* may be associated with higher channel and reception conditions on the uplink link (e.g., higher SNR conditions) and base station 105-*b* may select a higher MCS index associated with a CP-OFDM configuration (e.g., may implicitly switch from a DFT-S-OFDM configuration to a CP-OFDM configuration) for the uplink transmission based on the uplink channel conditions.

At 325, base station 105-*b* may transmit, to UE 115-*b*, an indication (e.g., as part of a message) of resources for the uplink transmission and an MCS index to be used for the uplink transmission, where the MCS index may be from the configured set of MCS indexes (e.g., an MCS table, such as a hybrid MCS table). The indication of the resources may include control signaling scheduling the uplink transmission (e.g., DCI scheduling the uplink transmission using a grant of resources) or may include configuration signaling that configures one or more sets of resources (e.g., configured grants) for the uplink transmission. The indication of the resources may further include the MCS index for the grant based uplink transmission or for the configured grant uplink transmission (e.g., configured using a ConfiguredGrantConfig parameter). In some cases, if the indication of the resources includes configuration signaling, the indication of the set of MCS indexes and the indication of the resources may be transmitted via a same message (e.g., may both be included or indicated by a ConfiguredGrantConfig parameter).

At 330, UE 115-*b* may determine a waveform configuration for the uplink transmission based on the MCS index and the threshold MCS index. For example, UE 115-*b* may compare the MCS index to the threshold index and may select the first waveform configuration if the MCS index is greater than the threshold MCS index or may select the second waveform configuration if the MCS index is less than or equal to the threshold MCS index.

In a first example, UE 115-*b* may determine that the MCS index is above the threshold MCS index and may use a first waveform configuration, such as a CP-OFDM waveform configuration, for the uplink transmission (e.g., one or more scheduled grant based or configured grant uplink transmissions associated with the MCS index). In a second example, UE 115-*b* may determine that the MCS index is at or below the threshold MCS index and may use a second waveform configuration, such as a DFT-S-OFDM waveform configuration, for the uplink transmission (e.g., one or more scheduled grant based or configured grant uplink transmissions associated with the MCS index).

At 335 and 340, in some cases, base station 105-*b* and UE 115-*b* may, respectively, determine that the waveform configuration for the uplink transmission is different than the third waveform configuration associated with the one or more uplink transmissions. In a first example, UE 115-*b* may use a CP-OFDM waveform configuration for the one or more uplink transmissions based on a higher communication channel quality for an uplink channel (e.g., a higher corresponding SNR and MCS index), and the MCS index for the uplink transmission may be associated with a DFT-S-OFDM waveform configuration (e.g., based on a lower communication channel quality for an uplink channel associated with UE 115-*b*). In a second example, UE 115-*b* may be configured to use a DFT-S-OFDM waveform configuration for the one or more uplink transmissions based on a lower communication channel quality for an uplink channel (e.g., a lower corresponding SNR and MCS index), and the MCS index for the uplink transmission may be associated with a CP-OFDM configuration (e.g., based on a higher communication channel quality for an uplink channel associated with UE 115-*b*).

Different waveform configurations (e.g., between CP-OFDM and DFT-S-OFDM among other various options and examples) may include differences in transmission generation for the uplink communication (e.g., different radio frequency chain configurations), as well as other differences in reference signal configurations (e.g., phase tracking reference signal (PTRS) generation and mapping, demodulation reference signal (DMRS) configuration options and sequence generation). These differences may result in UE 115-*b* cleaning one or more buffers or performing one or more reconfigurations when switching waveform configurations, which may result in a transmission delay. In order to support transmission of the uplink transmission after switching waveform configurations, UE 115-*b* and/or base station 105-*b* may identify a time or duration 355 (e.g., a minimum time or duration) between the indication of the resources for the uplink transmission (e.g., a scheduling DCI) and the uplink transmission for an uplink allocation where waveform switching takes place.

The duration 355 may, in some cases, correspond to a minimum duration (e.g., a $K_2$ value) of slots between the scheduling transmission (e.g., downlink control information) and the scheduled uplink resources for the uplink transmission. The duration 355 (e.g., minimum duration) may be associated with switches in waveform configuration, such that the duration 355 (e.g., a limitation imposed by duration 355) may not apply when the waveform configuration does not change or switch. The duration 355 may support the actions performed by UE 115-*b* (e.g., cleaning buffer(s) or reconfiguring) or radio frequency reconfiguration to switch waveforms for the uplink transmission. The duration 355 may be signaled by base station 105-*b* (e.g., as determined or selected by base station 105-*b*), may be included (e.g., as a mandatory requirement) in a wireless communications standard (e.g., a common expectation or definition at base station 105-*b* or UE 115-*b*), or both.

At 345, UE 115-*b* may transmit, to base station 105-*b*, the uplink transmission using the waveform configuration, based on determining the waveform configuration at 330. For example, UE 115-*b* may transmit the uplink transmission using a CP-OFDM configuration or a DFT-S-OFDM configuration, based on the indicated MCS index and the threshold MCS index. UE 115-*b* may also perform one or more other actions associated with transmitting the uplink transmission as described herein. Base station 105-*b* may receive the uplink transmission based on the corresponding indicated MCS index and the associated waveform configuration.

At 350, in some cases, UE 115-*b* and base station 105-*b* may maintain one or more active HARQ processes associated with the one or more uplink transmissions. In case of waveform switching while performing these active HARQ processes, base station 105-*b* may address these HARQ processes, for example, based on determining that a most recently indicated (e.g., implicitly indicated) waveform configuration for the uplink transmission is different than the third waveform configuration used for the one or more uplink transmissions associated with the one or more active HARQ processes.

In a first example, UE 115-*b* and base station 105-*b* may terminate all active HARQ processes (e.g., HARQ retransmissions) associated with the third waveform configuration (e.g., brute force termination) after switching waveform configurations. For example, base station 105-*b* may determine that a switch has taken place and UE 115-*b* may not retransmit HARQ related retransmissions using the third waveform associated with their initial transmission. For example, base station 105-*b* may refrain from scheduling additional retransmissions for these active HARQ processes. Base station 105-*b* may instead schedule a new data transmission with a same data payload (e.g., MAC level retransmission) and may discard active HARQ buffers corresponding to the active HARQ processes. This first example may apply to situations associated with a larger delay (e.g., minimum delay requirement) for adjusting to a waveform configuration change at UE 115-*b* (e.g., a larger $K_2$ value).

In a second example, UE 115-*b* and base station 105-*b* may maintain one or more active HARQ processes (e.g., HARQ retransmissions) associated with the third waveform configuration (e.g., for a corresponding initial transmission) after switching waveform configurations. UE 115-*b* and base station 105-*b* may continue using the third waveform configuration for the one or more active HARQ processes and related retransmissions, for example, based on a configuration. For example, UE 115-*b* may use the new implicitly signaled waveform configuration for the uplink transmission and related retransmissions and may use the third waveform for the one or more retransmissions related to the active HARQ processes existing before the waveform switching (e.g., may toggle a waveform back and forth during a time duration). This second example may apply to situations associated with a smaller delay for adjusting to a waveform configuration change at UE 115-*b* (e.g., a smaller $K_2$ value). In some cases, an MCS index for the HARQ retransmissions (e.g., a reserved MCS index) may implicitly indicate a different waveform than the third waveform, and UE 115-*b* and base station 105-*b* may use the different waveform indicated for the feedback retransmissions.

Figure 4:
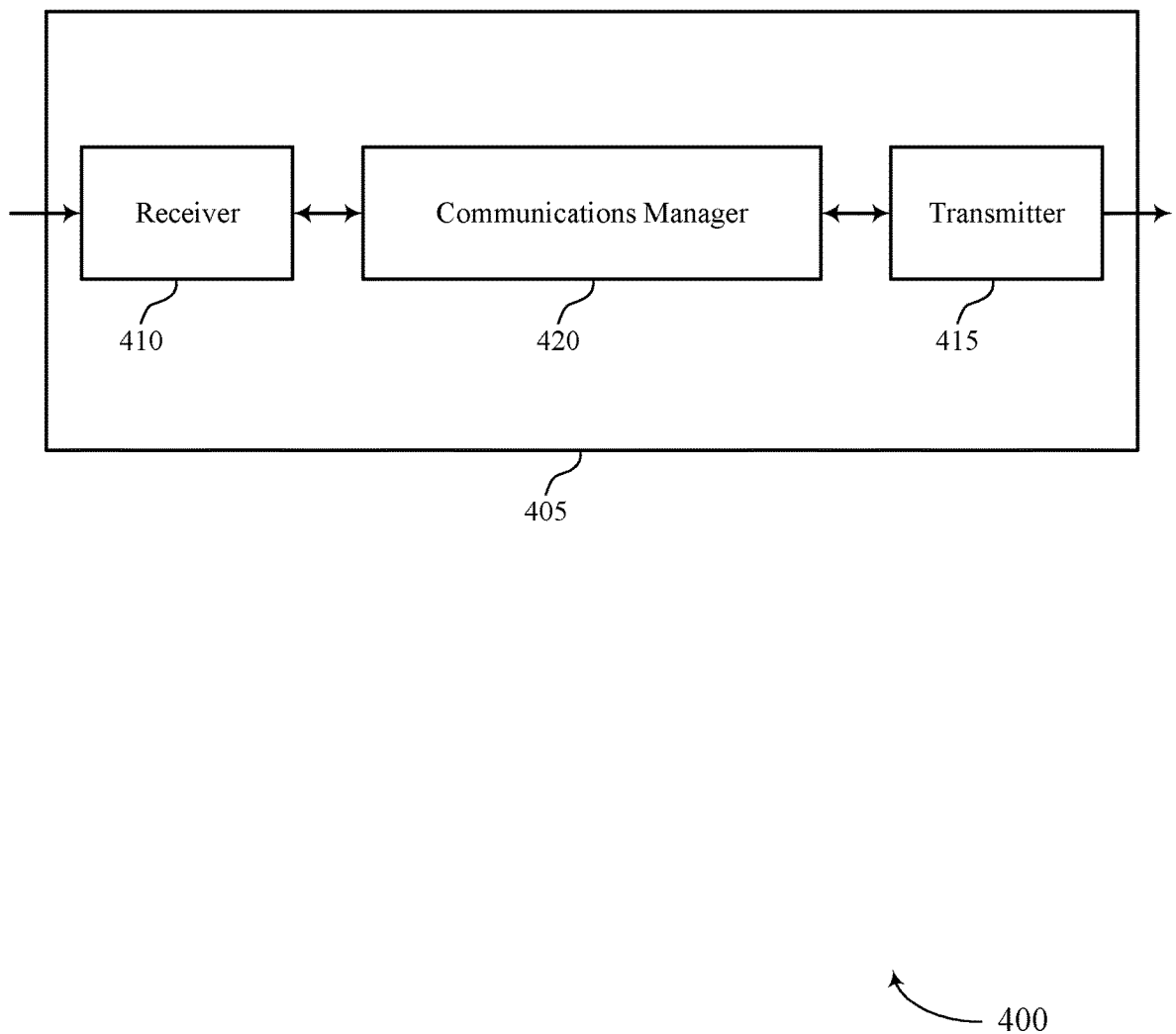
FIGS. 4 and 5 show block diagrams of devices that support techniques for implicitly indicating a waveform configuration in accordance with aspects of the present disclosure.

FIG. 4 shows a block diagram 400 of a device 405 that supports techniques for indicating a waveform configuration in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for indicating a waveform configuration). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for indicating a waveform configuration). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for indicating a waveform configuration as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving, from a base station, an indication of a set of MCS indexes associated with both a first waveform configuration and a second waveform configuration. The communications manager 420 may be configured as or otherwise support a means for receiving, from the base station, an indication of resources for an uplink transmission and of an MCS index from the set of MCS indexes and associated with the uplink transmission. The communications manager 420 may be configured as or otherwise support a means for determining a waveform configuration from the first waveform configuration and the second waveform configuration based on the MCS index and a threshold MCS index. The communications manager 420 may be configured as or otherwise support a means for transmitting the uplink transmission using the waveform configuration based on determining the waveform configuration.

The actions performed by the communications manager 415, among other examples herein, may be implemented to realize one or more potential advantages. For example, communications manager 415 may increase available battery power and communication quality at a wireless device (e.g., a UE 115) by supporting a dynamic indication of a waveform configuration. The increase in communication quality may result in increased link performance and decreased overhead based on the dynamically indicated waveform configuration. Accordingly, communications manager 415 may save power and increase battery life at a wireless device (e.g., a UE 115) by strategically increasing a quality of communications at a wireless device (e.g., a UE 115).

Figure 5:
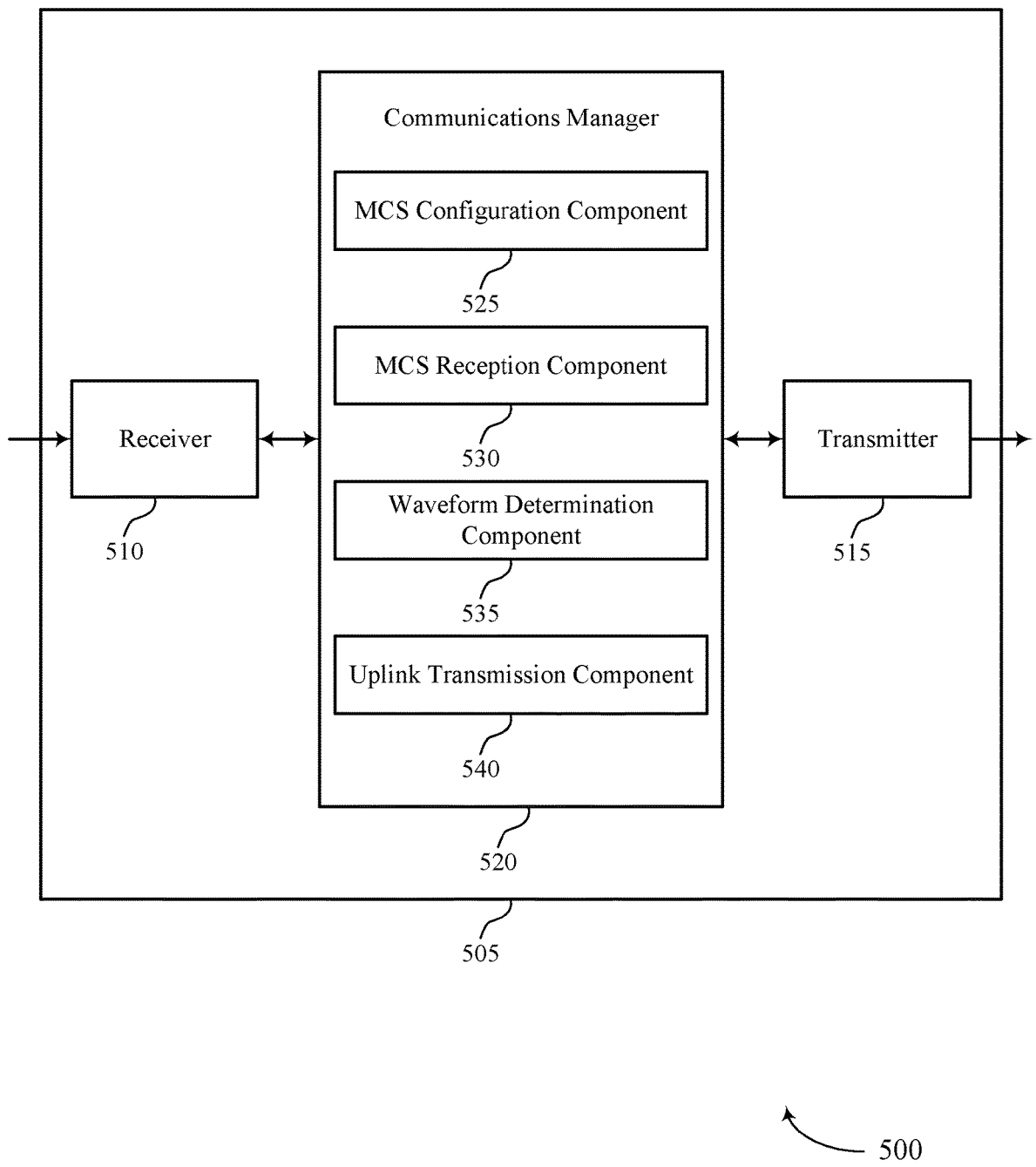

FIG. 5 shows a block diagram 500 of a device 505 that supports techniques for indicating a waveform configuration in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for indicating a waveform configuration). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for indicating a waveform configuration). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for indicating a waveform configuration as described herein. For example, the communications manager 520 may include an MCS configuration component 525, an MCS reception component 530, a waveform determination component 535, an uplink transmission component 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The MCS configuration component 525 may be configured as or otherwise support a means for receiving, from a base station, an indication of a set of MCS indexes associated with both a first waveform configuration and a second waveform configuration. The MCS reception component 530 may be configured as or otherwise support a means for receiving, from the base station, an indication of resources for an uplink transmission and of an MCS index from the set of MCS indexes and associated with the uplink transmission. The waveform determination component 535 may be configured as or otherwise support a means for determining a waveform configuration from the first waveform configuration and the second waveform configuration based on the MCS index and a threshold MCS index. The uplink transmission component 540 may be configured as or otherwise support a means for transmitting the uplink transmission using the waveform configuration based on determining the waveform configuration.

A processor of a wireless device (e.g., controlling the receiver 510, the transmitter 540, or the transceiver 720 as described with reference to FIG. 7) may increase available battery power and communication quality. The increased communication quality may increase available battery power and throughput (e.g., via implementation of system components described with reference to FIG. 6) compared to other systems and techniques, for example, that do not support dynamic indication of a waveform configuration, which may decrease communication quality and increase power consumption. Further, the processor of the wireless device may identify one or more aspects of a hybrid MCS table to determine the waveform configuration. The processor of the wireless device may use the determined waveform configuration to perform one or more actions that may result in increased communication quality, as well as save power and increase battery life at the wireless device (e.g., by strategically supporting increased communication quality by using the determined waveform configuration), among other benefits.

Figure 6:
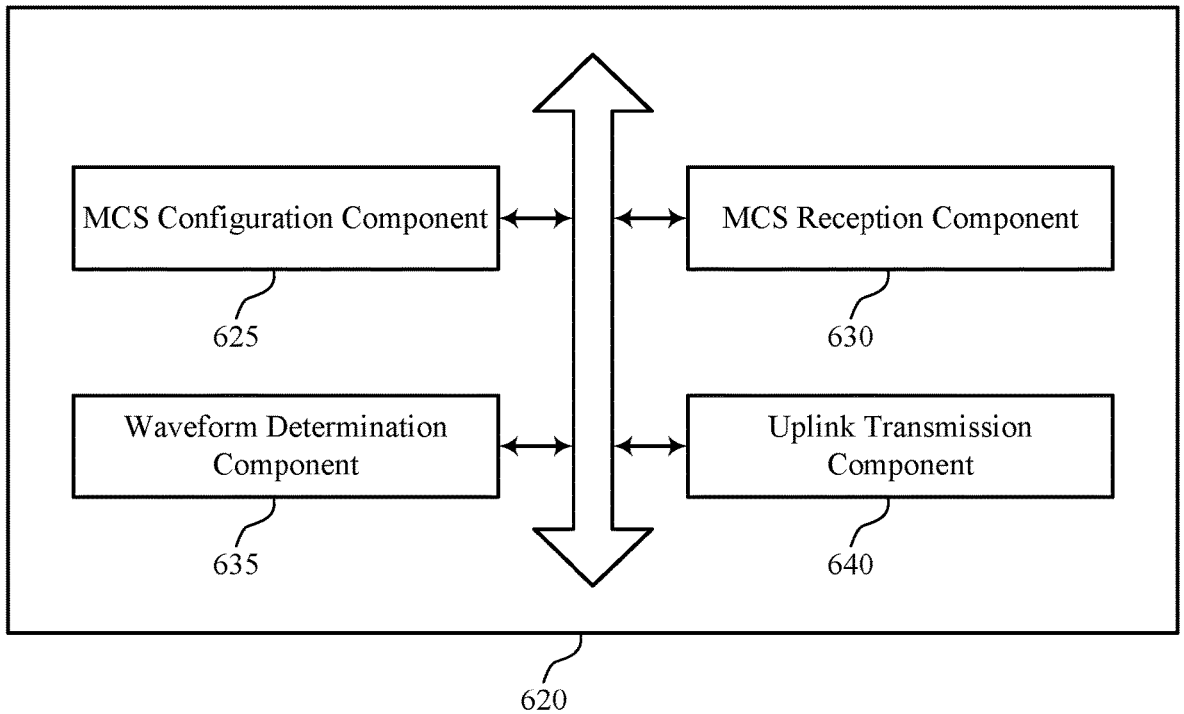
FIG. 6 shows a block diagram of a communications manager that supports techniques for implicitly indicating a waveform configuration in accordance with aspects of the present disclosure.

FIG. 6 shows a block diagram 600 of a communications manager 620 that supports techniques for indicating a waveform configuration in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for indicating a waveform configuration as described herein. For example, the communications manager 620 may include an MCS configuration component 625, an MCS reception component 630, a waveform determination component 635, an uplink transmission component 640, or any combination thereof. Each of these components may communicate, directly or indirectly, with one another (e.g., via one or more buses).

The communications manager 620 may support wireless communication at a UE in accordance with examples as disclosed herein. The MCS configuration component 625 may be configured as or otherwise support a means for receiving, from a base station, an indication of a set of MCS indexes associated with both a first waveform configuration and a second waveform configuration. The MCS reception component 630 may be configured as or otherwise support a means for receiving, from the base station, an indication of resources for an uplink transmission and of an MCS index from the set of MCS indexes and associated with the uplink transmission. The waveform determination component 635 may be configured as or otherwise support a means for determining a waveform configuration from the first waveform configuration and the second waveform configuration based on the MCS index and a threshold MCS index. The uplink transmission component 640 may be configured as or otherwise support a means for transmitting the uplink transmission using the waveform configuration based on determining the waveform configuration.

In some examples, the indication of the resources indicates one or more configured uplink transmissions or indicates a scheduled uplink transmission.

In some examples, the waveform determination component 635 may be configured as or otherwise support a means for comparing the MCS index to the threshold MCS index, where determining the waveform configuration is based on comparing the MCS index to the threshold MCS index. In some examples, the waveform determination component 635 may be configured as or otherwise support a means for determining that the MCS index is greater than the threshold MCS index based on comparing the MCS index to the threshold MCS index. In some examples, to determine the waveform configuration, the waveform determination component 635 may be configured as or otherwise support a means for determining the first waveform configuration based on the MCS index being greater than the threshold MCS index.

In some examples, the waveform determination component 635 may be configured as or otherwise support a means for determining that the MCS index is less than or equal to the threshold MCS index based on comparing the MCS index to the threshold MCS index. In some examples, to determine the waveform configuration, the waveform determination component 635 may be configured as or otherwise support a means for determining the second waveform configuration based on the MCS index being less than or equal to the threshold MCS index. In some examples, the waveform determination component 635 may be configured as or otherwise support a means for receiving an indication of the threshold MCS index, where determining the waveform configuration is based on receiving the indication of the threshold MCS index.

In some examples, the uplink transmission component 640 may be configured as or otherwise support a means for transmitting, before receiving the indication of the resources, one or more uplink transmissions. In some examples, the waveform determination component 635 may be configured as or otherwise support a means for determining that the waveform configuration is different than a third waveform configuration used for the one or more uplink transmissions, where transmitting the uplink transmission is based on determining that the waveform configuration is different than the third waveform configuration.

In some examples, the uplink transmission component 640 may be configured as or otherwise support a means for identifying, based on signaling received from the base station and determining that the waveform configuration is different than the third waveform configuration, a first duration between the indication of the resources and the uplink transmission, where transmitting the uplink transmission is based on identifying the first duration. In some examples, the uplink transmission component 640 may be configured as or otherwise support a means for performing a respective retransmission for one or more active HARQ processes associated with the one or more uplink transmissions using the third waveform configuration.

In some examples, MCS indexes of the set of MCS indexes corresponding to the first waveform configuration are greater than the threshold MCS index and MCS indexes of the set of MCS indexes corresponding to the second waveform configuration are less than or equal to the threshold MCS index. In some examples, the MCS index is based on a level of an SNR ratio associated with uplink communications from the UE. In some examples, the first waveform configuration includes a CP-OFDM waveform and the second waveform configuration includes a DFT-S-OFDM waveform.

In some examples, the waveform determination component 635 may be configured as or otherwise support a means for determining that the MCS index corresponds to a subset of MCS indexes of the set of MCS indexes, the subset of MCS indexes associated with the second waveform configuration and with uplink transmissions having two or more transmission layers. In some examples, the uplink transmission component 640 may be configured as or otherwise support a means for transmitting the uplink transmission using the second waveform configuration and with two or more transmission layers based on the MCS index corresponding to the subset of MCS indexes.

In some examples, the MCS reception component 630 may be configured as or otherwise support a means for receiving, from the base station, an indication of a number of transmission layers for the uplink transmission. In some examples, the uplink transmission component 640 may be configured as or otherwise support a means for transmitting the uplink transmission using the second waveform configuration and with two or more transmission layers based on the indication of the number of transmission layers.

Figure 7:
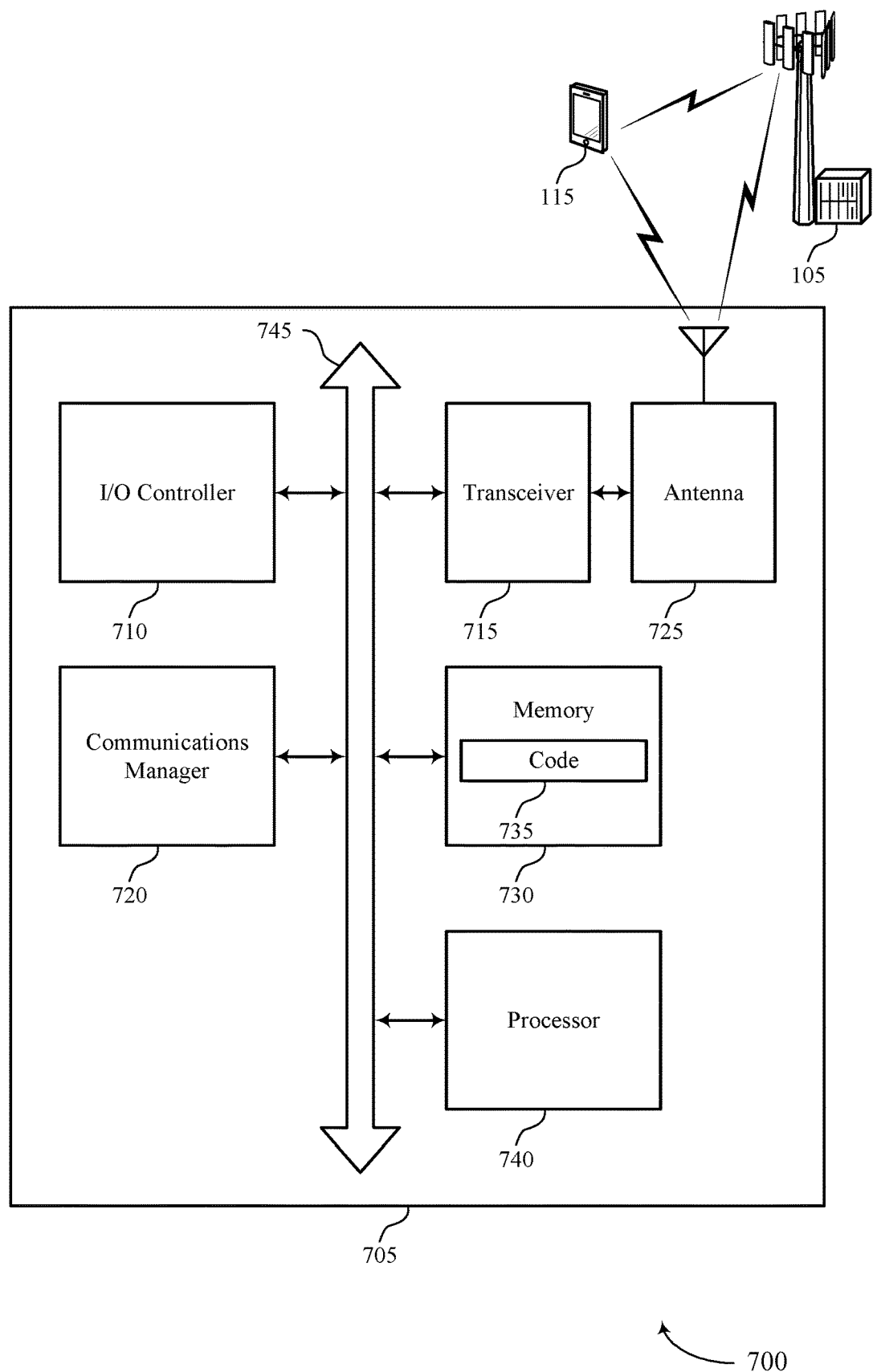
FIG. 7 shows a diagram of a system including a device that supports techniques for implicitly indicating a waveform configuration in accordance with aspects of the present disclosure.

FIG. 7 shows a diagram of a system 700 including a device 705 that supports techniques for indicating a waveform configuration in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for indicating a waveform configuration). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving, from a base station, an indication of a set of MCS indexes associated with both a first waveform configuration and a second waveform configuration. The communications manager 720 may be configured as or otherwise support a means for receiving, from the base station, an indication of resources for an uplink transmission and of an MCS index from the set of MCS indexes and associated with the uplink transmission. The communications manager 720 may be configured as or otherwise support a means for determining a waveform configuration from the first waveform configuration and the second waveform configuration based on the MCS index and a threshold MCS index. The communications manager 720 may be configured as or otherwise support a means for transmitting the uplink transmission using the waveform configuration based on determining the waveform configuration.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for indicating a waveform configuration as described herein, or the processor 740 and the memory 730 may be otherwise configured to perform or support such operations.

Figure 8:
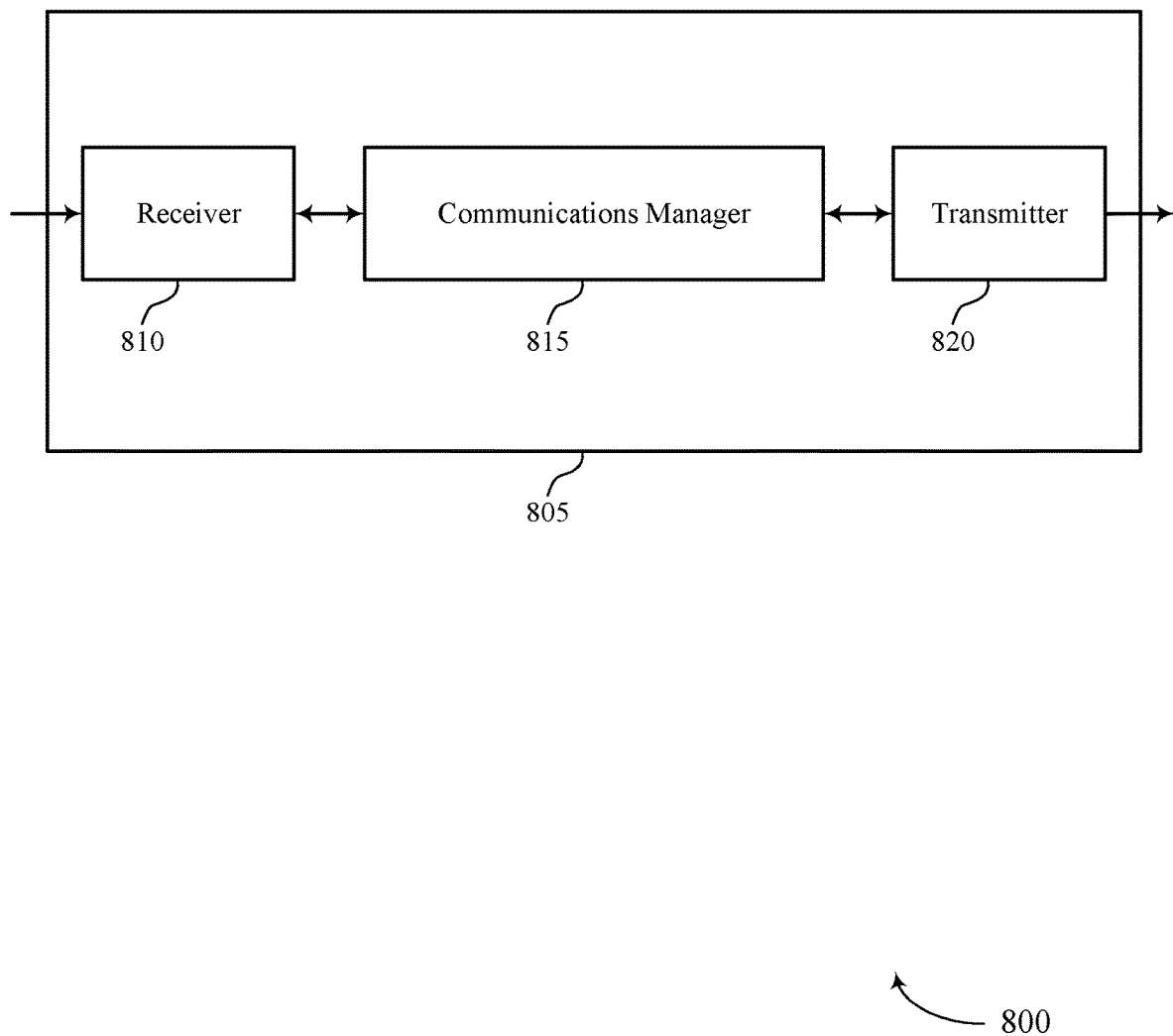
FIGS. 8 and 9 show block diagrams of devices that support techniques for implicitly indicating a waveform configuration in accordance with aspects of the present disclosure.

FIG. 8 shows a block diagram 800 of a device 805 that supports techniques for indicating a waveform configuration in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for indicating a waveform configuration). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for indicating a waveform configuration). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for indicating a waveform configuration as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting, to a UE, an indication of a set of MCS indexes associated with both of a first waveform configuration and a second waveform configuration. The communications manager 820 may be configured as or otherwise support a means for transmitting, to the UE, an indication of resources for an uplink transmission and of an MCS index from the set of MCS indexes and associated with the uplink transmission. The communications manager 820 may be configured as or otherwise support a means for receiving the uplink transmission using a waveform configuration including the first waveform configuration or the second waveform configuration, the waveform configuration based on the MCS index and a threshold MCS index.

Figure 9:
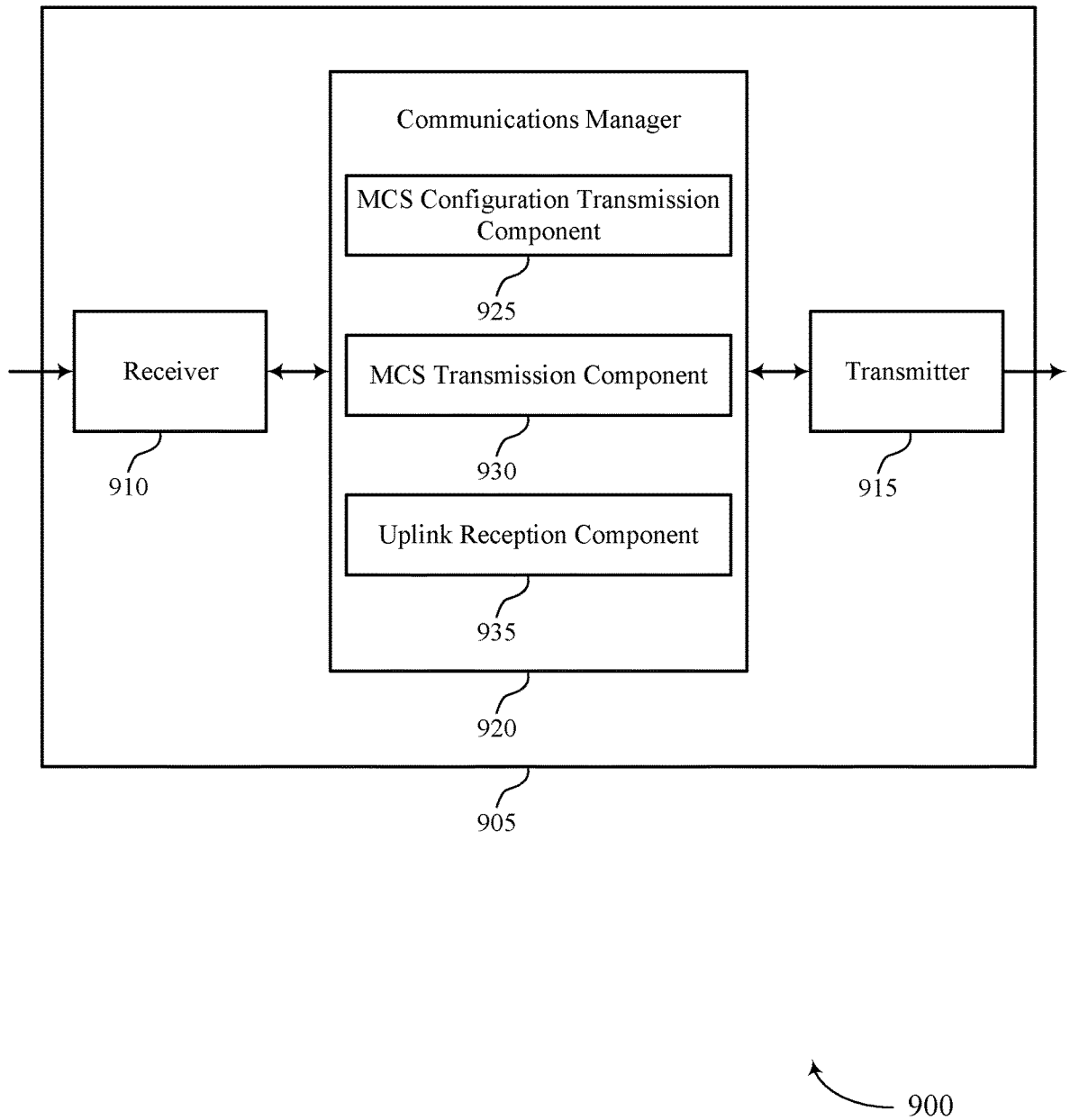

FIG. 9 shows a block diagram 900 of a device 905 that supports techniques for indicating a waveform configuration in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for indicating a waveform configuration). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for indicating a waveform configuration). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for indicating a waveform configuration as described herein. For example, the communications manager 920 may include an MCS configuration transmission component 925, an MCS transmission component 930, an uplink reception component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The MCS configuration transmission component 925 may be configured as or otherwise support a means for transmitting, to a UE, an indication of a set of MCS indexes associated with both of a first waveform configuration and a second waveform configuration. The MCS transmission component 930 may be configured as or otherwise support a means for transmitting, to the UE, an indication of resources for an uplink transmission and of an MCS index from the set of MCS indexes and associated with the uplink transmission. The uplink reception component 935 may be configured as or otherwise support a means for receiving the uplink transmission using a waveform configuration including the first waveform configuration or the second waveform configuration, the waveform configuration based on the MCS index and a threshold MCS index.

Figure 10:
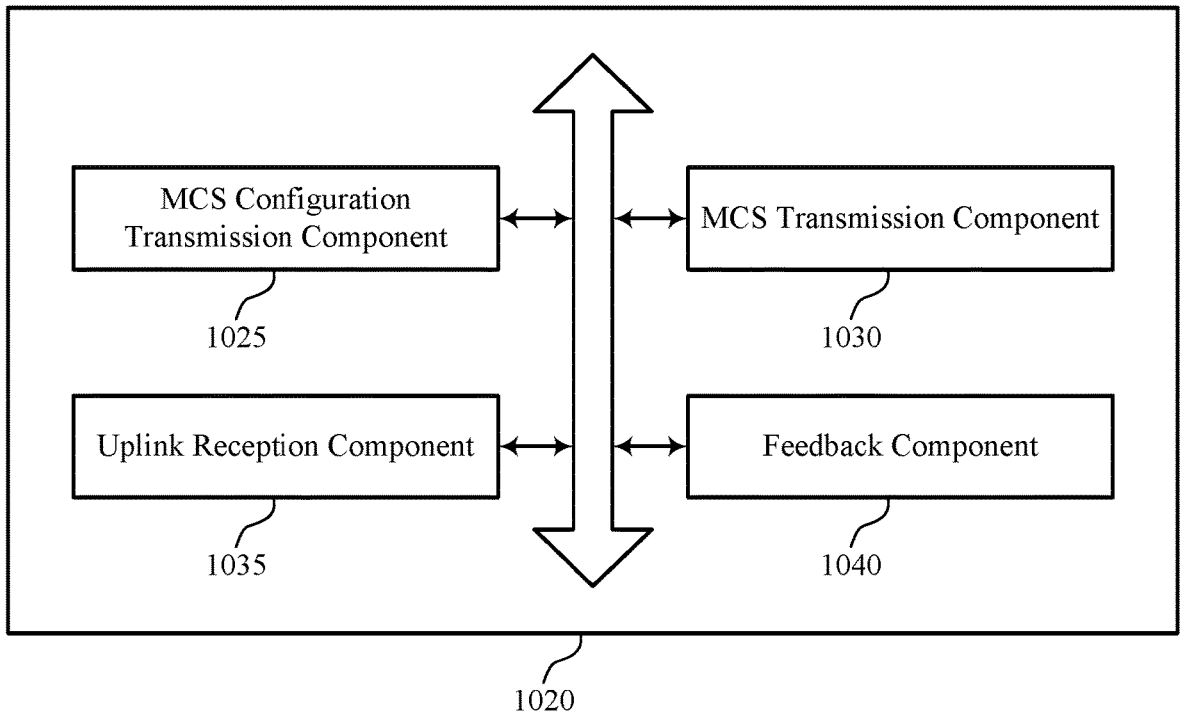
FIG. 10 shows a block diagram of a communications manager that supports techniques for implicitly indicating a waveform configuration in accordance with aspects of the present disclosure.

FIG. 10 shows a block diagram 1000 of a communications manager 1020 that supports techniques for indicating a waveform configuration in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for indicating a waveform configuration as described herein. For example, the communications manager 1020 may include an MCS configuration transmission component 1025, an MCS transmission component 1030, an uplink reception component 1035, a feedback component 1040, or any combination thereof. Each of these components may communicate, directly or indirectly, with one another (e.g., via one or more buses).

The communications manager 1020 may support wireless communication at a base station in accordance with examples as disclosed herein. The MCS configuration transmission component 1025 may be configured as or otherwise support a means for transmitting, to a UE, an indication of a set of MCS indexes associated with both of a first waveform configuration and a second waveform configuration. The MCS transmission component 1030 may be configured as or otherwise support a means for transmitting, to the UE, an indication of resources for an uplink transmission and of an MCS index from the set of MCS indexes and associated with the uplink transmission. The uplink reception component 1035 may be configured as or otherwise support a means for receiving the uplink transmission using a waveform configuration including the first waveform configuration or the second waveform configuration, the waveform configuration based on the MCS index and a threshold MCS index.

In some examples, the indication of the resources indicates one or more configured uplink transmissions or indicates a scheduled uplink transmission.

In some examples, the waveform configuration includes the first waveform configuration based on the MCS index being greater than the threshold MCS index. In some examples, the waveform configuration includes the second waveform configuration based on the MCS index being less than or equal to the threshold MCS index. In some examples, the MCS configuration transmission component 1025 may be configured as or otherwise support a means for transmitting an indication of the threshold MCS index, where the waveform configuration is based on the indication of the threshold MCS index.

In some examples, the uplink reception component 1035 may be configured as or otherwise support a means for scheduling, before transmitting the indication of the resources, one or more uplink transmissions associated with a third waveform configuration. In some examples, the uplink reception component 1035 may be configured as or otherwise support a means for determining that the waveform configuration is different than the third waveform configuration, where receiving the uplink transmission is based on determining that the waveform configuration is different than the third waveform configuration.

In some examples, the uplink reception component 1035 may be configured as or otherwise support a means for identifying, based on determining that the waveform configuration is different than the third waveform configuration, a first duration between the indication of the resources and the uplink transmission, where receiving the uplink transmission is based on identifying the first duration.

In some examples, the feedback component 1040 may be configured as or otherwise support a means for determining one or more active HARQ processes associated with the one or more uplink transmissions based on the waveform configuration being different than the third waveform configuration. In some examples, the feedback component 1040 may be configured as or otherwise support a means for terminating the one or more active HARQ processes based on the waveform configuration being different than the third waveform configuration. In some examples, the uplink reception component 1035 may be configured as or otherwise support a means for receiving a respective retransmission for one or more active HARQ processes associated with the one or more uplink transmissions using the third waveform configuration.

In some examples, MCS indexes of the set of MCS indexes corresponding to the first waveform configuration are greater than the threshold MCS index and MCS indexes of the set of MCS indexes corresponding to the second waveform configuration are less than or equal to the threshold MCS index. In some examples, the waveform configuration is based on a level of an SNR ratio for communications associated with the UE. In some examples, the first waveform configuration includes a CP-OFDM waveform and the second waveform configuration includes a DFT-S-OFDM waveform.

In some examples, the MCS transmission component 1030 may be configured as or otherwise support a means for determining the MCS index from a subset of MCS indexes of the set of MCS indexes, the subset of MCS indexes associated with the second waveform configuration and with uplink transmissions having two or more transmission layers. In some examples, the uplink reception component 1035 may be configured as or otherwise support a means for receiving the uplink transmission using the second waveform configuration and with two or more transmission layers based on determining the MCS index corresponding to the subset of MCS indexes.

In some examples, the MCS transmission component 1030 may be configured as or otherwise support a means for transmitting, to the UE, an indication of a number of transmission layers for the uplink transmission. In some examples, the uplink reception component 1035 may be configured as or otherwise support a means for receiving the uplink transmission using the second waveform configuration and with two or more transmission layers based on the indication of the number of transmission layers.

Figure 11:
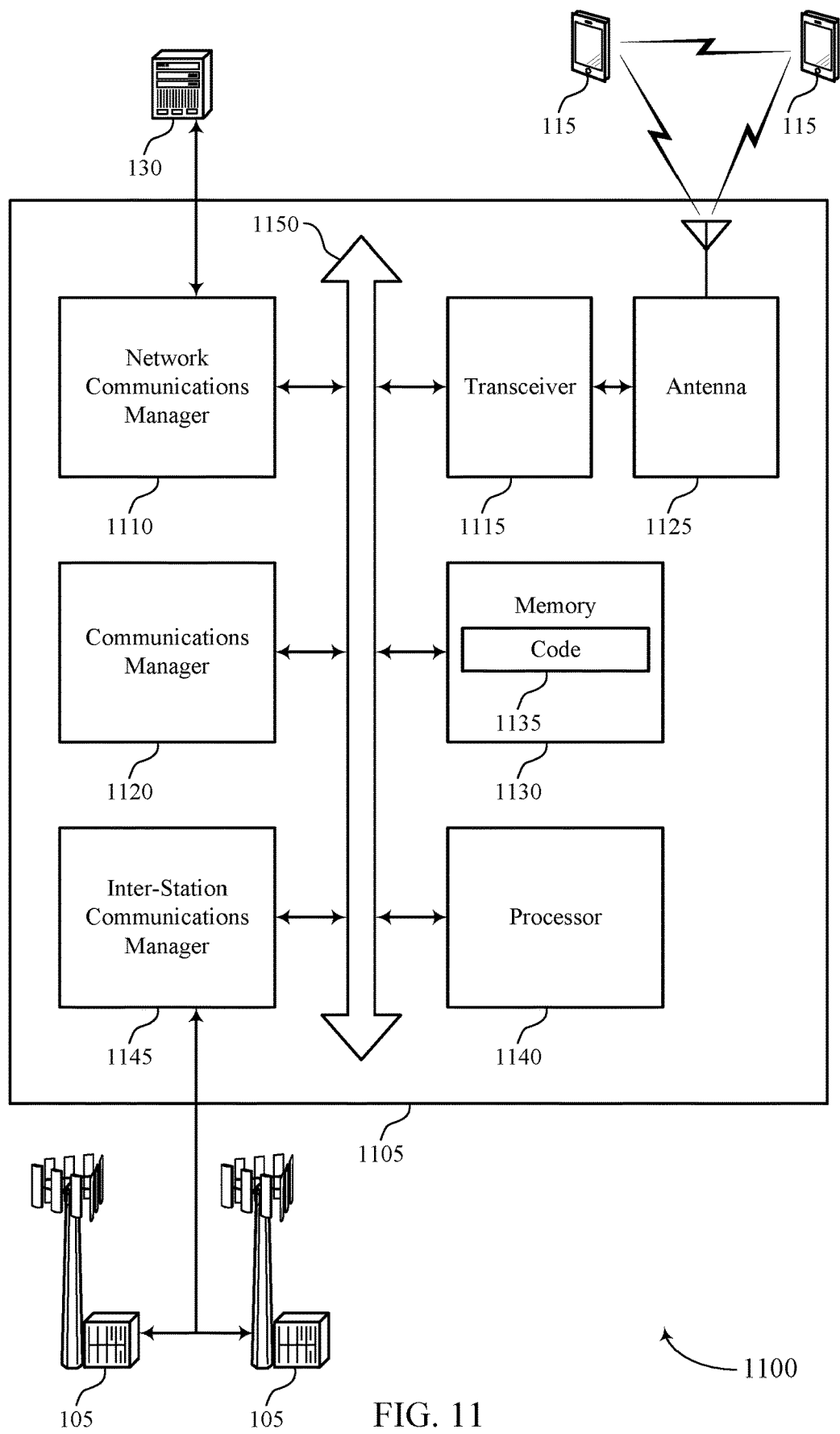
FIG. 11 shows a diagram of a system including a device that supports techniques for implicitly indicating a waveform configuration in accordance with aspects of the present disclosure.

FIG. 11 shows a diagram of a system 1100 including a device 1105 that supports techniques for indicating a waveform configuration in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for indicating a waveform configuration). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting, to a UE, an indication of a set of MCS indexes associated with both of a first waveform configuration and a second waveform configuration. The communications manager 1120 may be configured as or otherwise support a means for transmitting, to the UE, an indication of resources for an uplink transmission and of an MCS index from the set of MCS indexes and associated with the uplink transmission. The communications manager 1120 may be configured as or otherwise support a means for receiving the uplink transmission using a waveform configuration including the first waveform configuration or the second waveform configuration, the waveform configuration based on the MCS index and a threshold MCS index.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for indicating a waveform configuration as described herein, or the processor 1140 and the memory 1130 may be otherwise configured to perform or support such operations.

Figure 12:
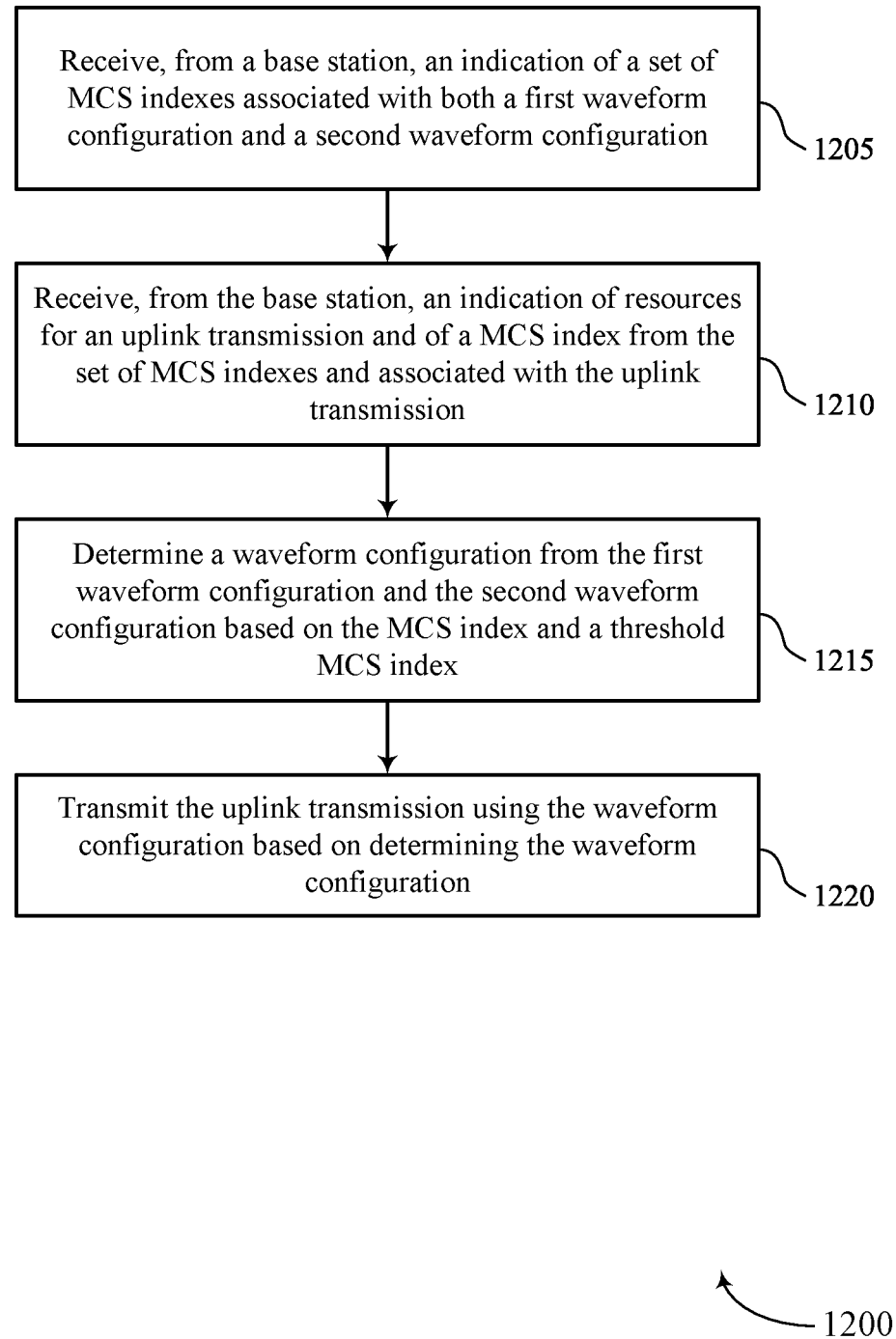
FIGS. 12 through 15 show flowcharts illustrating methods that support techniques for implicitly indicating a waveform configuration in accordance with aspects of the present disclosure.

FIG. 12 shows a flowchart illustrating a method 1200 that supports techniques for indicating a waveform configuration in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, an indication of a set of MCS indexes associated with both a first waveform configuration and a second waveform configuration. The operations of 1205 may be performed in accordance with examples as disclosed herein. In some examples, aspects of the operations of 1205 may be performed by an MCS configuration component 625 as described with reference to FIG. 6.

At 1210, the method may include receiving, from the base station, an indication of resources for an uplink transmission and of an MCS index from the set of MCS indexes and associated with the uplink transmission. The operations of 1210 may be performed in accordance with examples as disclosed herein. In some examples, aspects of the operations of 1210 may be performed by an MCS reception component 630 as described with reference to FIG. 6.

At 1215, the method may include determining a waveform configuration from the first waveform configuration and the second waveform configuration based on the MCS index and a threshold MCS index. The operations of 1215 may be performed in accordance with examples as disclosed herein. In some examples, aspects of the operations of 1215 may be performed by a waveform determination component 635 as described with reference to FIG. 6.

At 1220, the method may include transmitting the uplink transmission using the waveform configuration based on determining the waveform configuration. The operations of 1220 may be performed in accordance with examples as disclosed herein. In some examples, aspects of the operations of 1220 may be performed by an uplink transmission component 640 as described with reference to FIG. 6.

Figure 13:
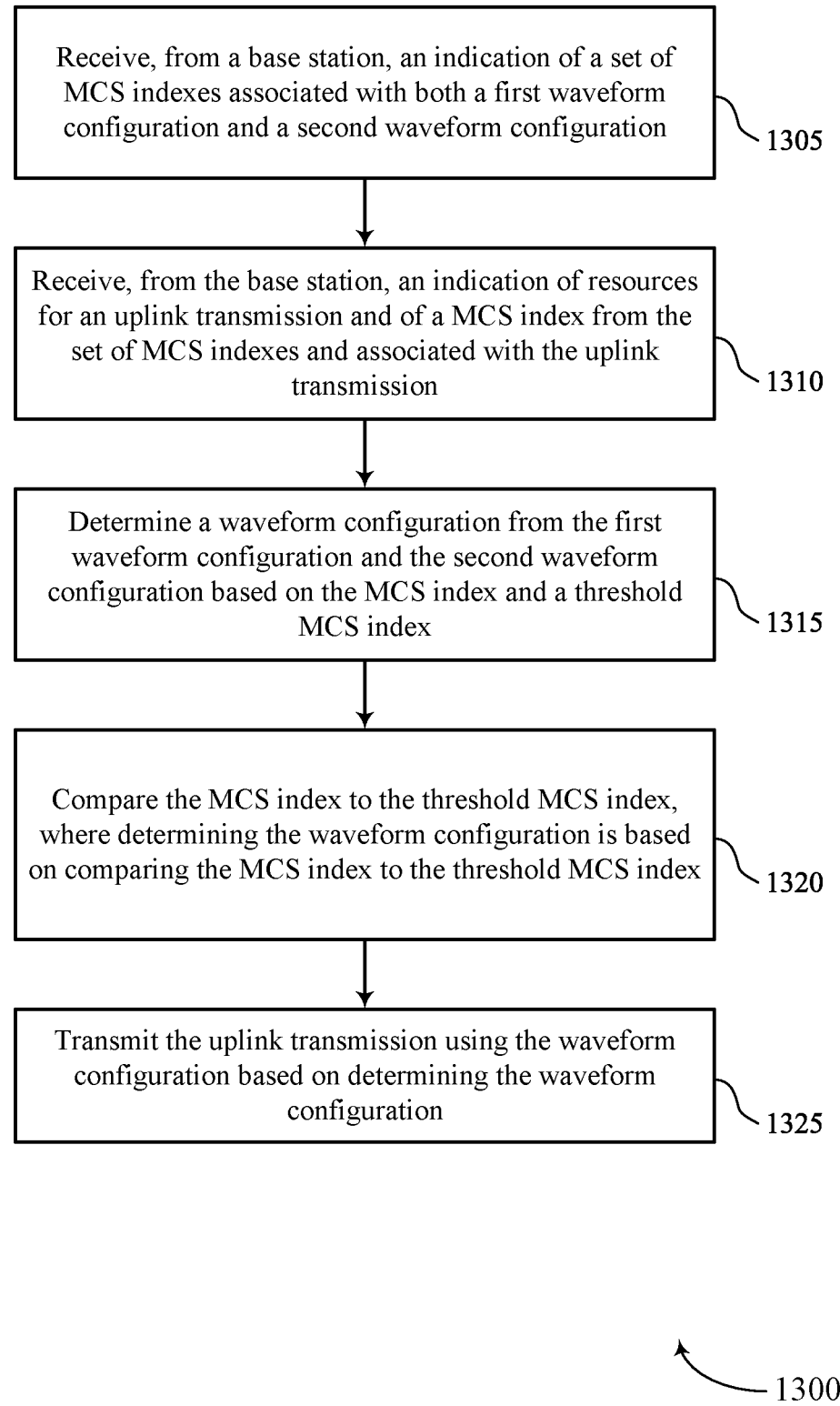

FIG. 13 shows a flowchart illustrating a method 1300 that supports techniques for indicating a waveform configuration in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, an indication of a set of MCS indexes associated with both a first waveform configuration and a second waveform configuration. The operations of 1305 may be performed in accordance with examples as disclosed herein. In some examples, aspects of the operations of 1305 may be performed by an MCS configuration component 625 as described with reference to FIG. 6.

At 1310, the method may include receiving, from the base station, an indication of resources for an uplink transmission and of an MCS index from the set of MCS indexes and associated with the uplink transmission. The operations of 1310 may be performed in accordance with examples as disclosed herein. In some examples, aspects of the operations of 1310 may be performed by an MCS reception component 630 as described with reference to FIG. 6.

At 1315, the method may include determining a waveform configuration from the first waveform configuration and the second waveform configuration based on the MCS index and a threshold MCS index. The operations of 1315 may be performed in accordance with examples as disclosed herein. In some examples, aspects of the operations of 1315 may be performed by a waveform determination component 635 as described with reference to FIG. 6.

At 1320, the method may include comparing the MCS index to the threshold MCS index, where determining the waveform configuration is based on comparing the MCS index to the threshold MCS index. The operations of 1320 may be performed in accordance with examples as disclosed herein. In some examples, aspects of the operations of 1320 may be performed by a waveform determination component 635 as described with reference to FIG. 6.

At 1325, the method may include transmitting the uplink transmission using the waveform configuration based on determining the waveform configuration. The operations of 1325 may be performed in accordance with examples as disclosed herein. In some examples, aspects of the operations of 1325 may be performed by an uplink transmission component 640 as described with reference to FIG. 6.

Figure 14:
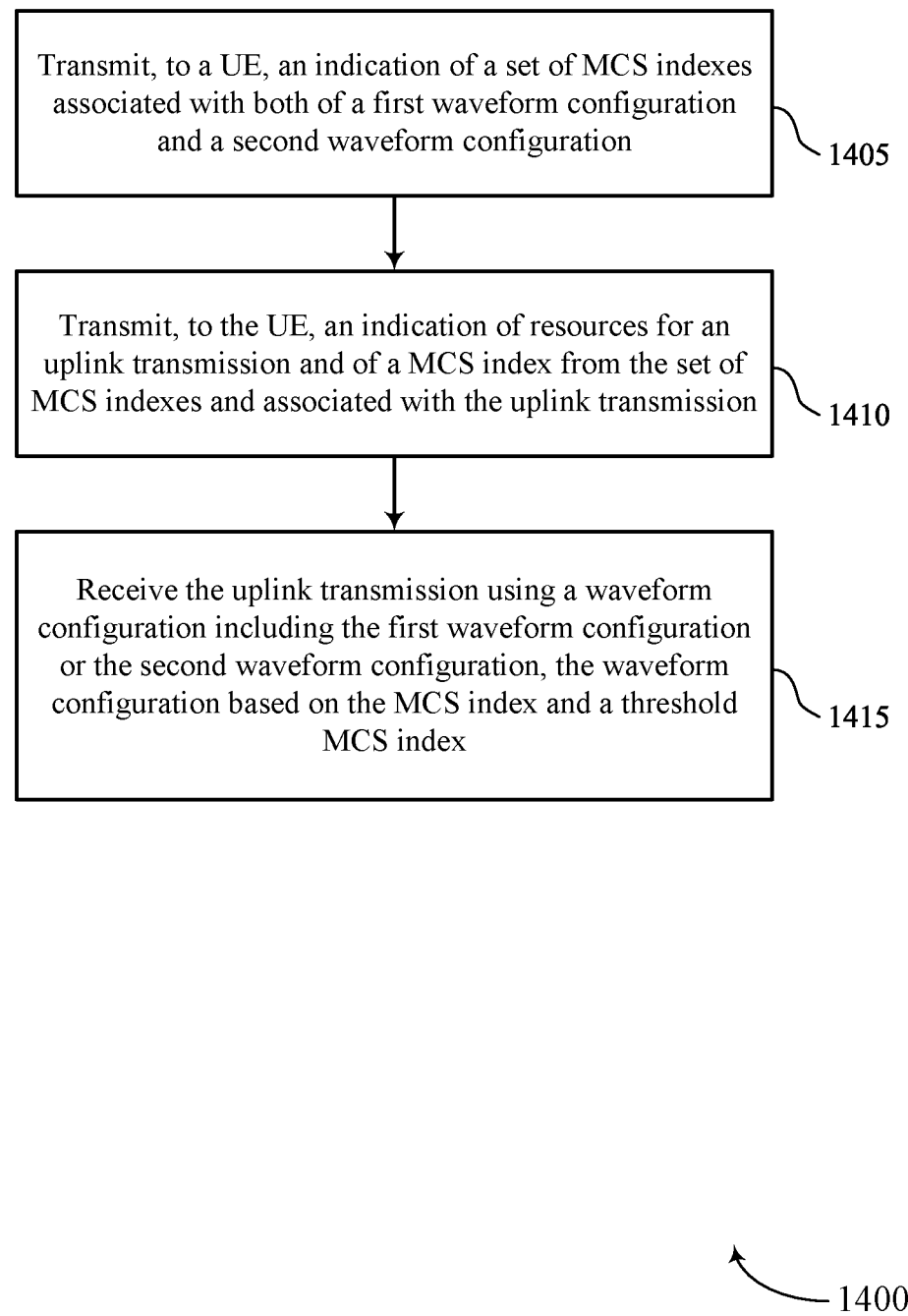

FIG. 14 shows a flowchart illustrating a method 1400 that supports techniques for indicating a waveform configuration in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include transmitting, to a UE, an indication of a set of MCS indexes associated with both of a first waveform configuration and a second waveform configuration. The operations of 1405 may be performed in accordance with examples as disclosed herein. In some examples, aspects of the operations of 1405 may be performed by an MCS configuration transmission component 1025 as described with reference to FIG. 10.

At 1410, the method may include transmitting, to the UE, an indication of resources for an uplink transmission and of an MCS index from the set of MCS indexes and associated with the uplink transmission. The operations of 1410 may be performed in accordance with examples as disclosed herein. In some examples, aspects of the operations of 1410 may be performed by an MCS transmission component 1030 as described with reference to FIG. 10.

At 1415, the method may include receiving the uplink transmission using a waveform configuration including the first waveform configuration or the second waveform configuration, the waveform configuration based on the MCS index and a threshold MCS index. The operations of 1415 may be performed in accordance with examples as disclosed herein. In some examples, aspects of the operations of 1415 may be performed by an uplink reception component 1035 as described with reference to FIG. 10.

Figure 15:
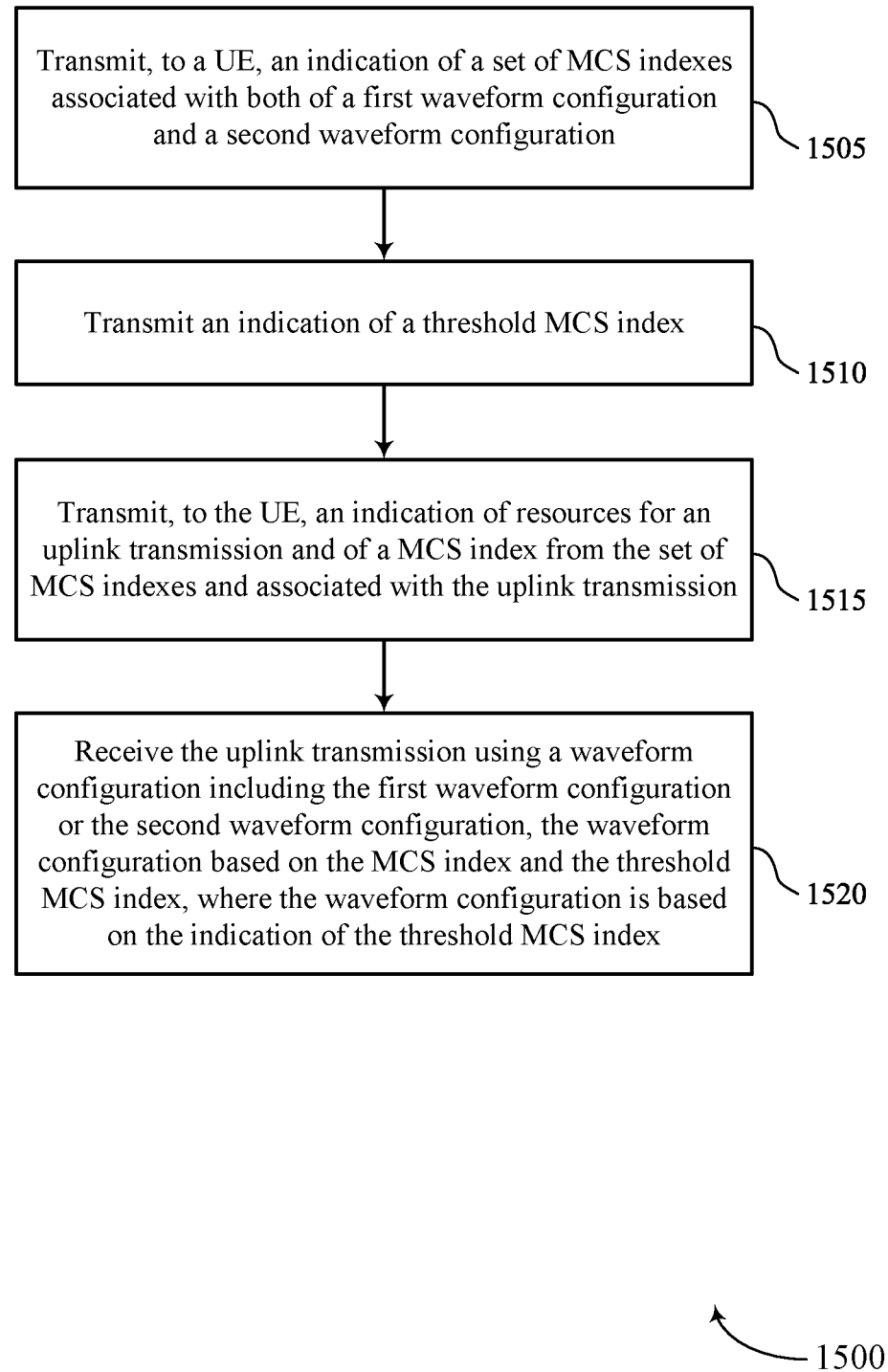

FIG. 15 shows a flowchart illustrating a method 1500 that supports techniques for indicating a waveform configuration in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, an indication of a set of MCS indexes associated with both of a first waveform configuration and a second waveform configuration. The operations of 1505 may be performed in accordance with examples as disclosed herein. In some examples, aspects of the operations of 1505 may be performed by an MCS configuration transmission component 1025 as described with reference to FIG. 10.

At 1510, the method may include transmitting an indication of a threshold MCS index. The operations of 1510 may be performed in accordance with examples as disclosed herein. In some examples, aspects of the operations of 1510 may be performed by an MCS configuration transmission component 1025 as described with reference to FIG. 10.

At 1515, the method may include transmitting, to the UE, an indication of resources for an uplink transmission and of an MCS index from the set of MCS indexes and associated with the uplink transmission. The operations of 1515 may be performed in accordance with examples as disclosed herein. In some examples, aspects of the operations of 1515 may be performed by an MCS transmission component 1030 as described with reference to FIG. 10.

At 1520, the method may include receiving the uplink transmission using a waveform configuration including the first waveform configuration or the second waveform configuration, the waveform configuration based on the MCS index and a threshold MCS index, where the waveform configuration is based on the indication of the threshold MCS index. The operations of 1520 may be performed in accordance with examples as disclosed herein. In some examples, aspects of the operations of 1520 may be performed by an uplink reception component 1035 as described with reference to FIG. 10.

The following provides an overview of aspects of the present disclosure:

Aspect 1: A method for wireless communication at a UE, comprising: receiving, from a base station, an indication of a set of MCS indexes associated with both a first waveform configuration and a second waveform configuration; receiving, from the base station, an indication of resources for an uplink transmission and of a MCS index from the set of MCS indexes and associated with the uplink transmission; determining a waveform configuration from the first waveform configuration and the second waveform configuration based at least in part on the MCS index and a threshold MCS index; and transmitting the uplink transmission using the waveform configuration based at least in part on determining the waveform configuration.

Aspect 2: The method of aspect 1, further comprising: comparing the MCS index to the threshold MCS index, wherein determining the waveform configuration is based at least in part on comparing the MCS index to the threshold MCS index.

Aspect 3: The method of aspect 2, further comprising: determining that the MCS index is greater than the threshold MCS index based at least in part on comparing the MCS index to the threshold MCS index, wherein determining the waveform configuration comprises: determining the first waveform configuration based at least in part on the MCS index being greater than the threshold MCS index.

Aspect 4: The method of aspect 2, further comprising: determining that the MCS index is less than or equal to the threshold MCS index based at least in part on comparing the MCS index to the threshold MCS index, wherein determining the waveform configuration comprises: determining the second waveform configuration based at least in part on the MCS index being less than or equal to the threshold MCS index.

Aspect 5: The method of any of aspects 1 through 4, further comprising: receiving an indication of the threshold MCS index, wherein determining the waveform configuration is based at least in part on receiving the indication of the threshold MCS index.

Aspect 6: The method of any of aspects 1 through 5, further comprising: transmitting, before receiving the indication of the resources, one or more uplink transmissions; and determining that the waveform configuration is different than a third waveform configuration used for the one or more uplink transmissions, wherein transmitting the uplink transmission is based at least in part on determining that the waveform configuration is different than the third waveform configuration.

Aspect 7: The method of aspect 6, further comprising: identifying, based at least in part on signaling received from the base station and determining that the waveform configuration is different than the third waveform configuration, a first duration between the indication of the resources and the uplink transmission, wherein transmitting the uplink transmission is based at least in part on identifying the first duration.

Aspect 8: The method of any of aspects 6 through 7, further comprising: performing a respective retransmission for one or more active HARQ processes associated with the one or more uplink transmissions using the third waveform configuration.

Aspect 9: The method of any of aspects 1 through 8, wherein the indication of the resources indicates one or more configured uplink transmissions or indicates a scheduled uplink transmission.

Aspect 10: The method of any of aspects 1 through 9, wherein MCS indexes of the set of MCS indexes corresponding to the first waveform configuration are greater than the threshold MCS index and MCS indexes of the set of MCS indexes corresponding to the second waveform configuration are less than or equal to the threshold MCS index.

Aspect 11: The method of any of aspects 1 through 10, wherein the MCS index is based at least in part on a level of a SNR ratio associated with uplink communications from the UE.

Aspect 12: The method of any of aspects 1 through 11, wherein the first waveform configuration comprises a CP-OFDM waveform and the second waveform configuration comprises a DFT-S-OFDM waveform.

Aspect 13: The method of any of aspects 1 through 12, further comprising: determining that the MCS index corresponds to a subset of MCS indexes of the set of MCS indexes, the subset of MCS indexes associated with the second waveform configuration and with uplink transmissions having two or more transmission layers; and transmitting the uplink transmission using the second waveform configuration and with two or more transmission layers based at least in part on the MCS index corresponding to the subset of MCS indexes.

Aspect 14: The method of any of aspects 1 through 13, further comprising: receiving, from the base station, an indication of a number of transmission layers for the uplink transmission; and transmitting the uplink transmission using the second waveform configuration and with two or more transmission layers based at least in part on the indication of the number of transmission layers.

Aspect 15: A method for wireless communication at a base station, comprising: transmitting, to a UE, an indication of a set of MCS indexes associated with both of a first waveform configuration and a second waveform configuration; transmitting, to the UE, an indication of resources for an uplink transmission and of a MCS index from the set of MCS indexes and associated with the uplink transmission; and receiving the uplink transmission using a waveform configuration comprising the first waveform configuration or the second waveform configuration, the waveform configuration based at least in part on the MCS index and a threshold MCS index.

Aspect 16: The method of aspect 15, wherein the waveform configuration comprises the first waveform configuration based at least in part on the MCS index being greater than the threshold MCS index.

Aspect 17: The method of aspect 15, wherein the waveform configuration comprises the second waveform configuration based at least in part on the MCS index being less than or equal to the threshold MCS index.

Aspect 18: The method of any of aspects 15 through 17, further comprising: transmitting an indication of the threshold MCS index, wherein the waveform configuration is based at least in part on the indication of the threshold MCS index.

Aspect 19: The method of any of aspects 15 through 18, further comprising: scheduling, before transmitting the indication of the resources, one or more uplink transmissions associated with a third waveform configuration; and determining that the waveform configuration is different than the third waveform configuration, wherein receiving the uplink transmission is based at least in part on determining that the waveform configuration is different than the third waveform configuration.

Aspect 20: The method of aspect 19, further comprising: identifying, based at least in part on determining that the waveform configuration is different than the third waveform configuration, a first duration between the indication of the resources and the uplink transmission, wherein receiving the uplink transmission is based at least in part on identifying the first duration.

Aspect 21: The method of any of aspects 19 through 20, further comprising: determining one or more active HARQ processes associated with the one or more uplink transmissions based at least in part on the waveform configuration being different than the third waveform configuration; and terminating the one or more active HARQ processes based at least in part on the waveform configuration being different than the third waveform configuration.

Aspect 22: The method of any of aspects 19 through 20, further comprising: receiving a respective retransmission for one or more active HARQ processes associated with the one or more uplink transmissions using the third waveform configuration.

Aspect 23: The method of any of aspects 15 through 22, wherein the indication of the resources indicates one or more configured uplink transmissions or indicates a scheduled uplink transmission.

Aspect 24: The method of any of aspects 15 through 23, wherein MCS indexes of the set of MCS indexes corresponding to the first waveform configuration are greater than the threshold MCS index and MCS indexes of the set of MCS indexes corresponding to the second waveform configuration are less than or equal to the threshold MCS index.

Aspect 25: The method of any of aspects 15 through 24, wherein the waveform configuration is based at least in part on a level of a SNR for communications associated with the UE.

Aspect 26: The method of any of aspects 15 through 25, wherein the first waveform configuration comprises a CP-OFDM waveform and the second waveform configuration comprises a DFT-S-OFDM waveform.

Aspect 27: The method of any of aspects 15 through 26, further comprising: determining the MCS index from a subset of MCS indexes of the set of MCS indexes, the subset of MCS indexes associated with the second waveform configuration and with uplink transmissions having two or more transmission layers; and receiving the uplink transmission using the second waveform configuration and with two or more transmission layers based at least in part on determining the MCS index corresponding to the subset of MCS indexes.

Aspect 28: The method of any of aspects 15 through 27, further comprising: transmitting, to the UE, an indication of a number of transmission layers for the uplink transmission; and receiving the uplink transmission using the second waveform configuration and with two or more transmission layers based at least in part on the indication of the number of transmission layers.

Aspect 29: An apparatus for wireless communication at a UE, comprising a processor; memory coupled with the processor; and instructions stored in the memory and executable by the processor to cause the apparatus to perform a method of any of aspects 1 through 14.

Aspect 30: An apparatus for wireless communication at a UE, comprising at least one means for performing a method of any of aspects 1 through 14.

Aspect 31: A non-transitory computer-readable medium storing code for wireless communication at a UE, the code comprising instructions executable by a processor to perform a method of any of aspects 1 through 14.

Aspect 32: An apparatus for wireless communication at a base station, comprising a processor; memory coupled with the processor; and instructions stored in the memory and executable by the processor to cause the apparatus to perform a method of any of aspects 15 through 28.

Aspect 33: An apparatus for wireless communication at a base station, comprising at least one means for performing a method of any of aspects 15 through 28.

Aspect 34: A non-transitory computer-readable medium storing code for wireless communication at a base station, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example feature that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
   a memory; and
   at least one processor coupled to the memory, wherein the at least one processor is configured to:
      receive, from a network device, an indication of a set of modulation coding scheme indexes associated with both a first waveform configuration and a second waveform configuration;
      receive, from the network device, an indication of resources for an uplink transmission and of a modulation coding scheme index from the set of modulation coding scheme indexes and associated with the uplink transmission;
      determine a waveform configuration from the first waveform configuration and the second waveform configuration based on the modulation coding scheme index and a threshold modulation coding scheme index; and
      transmit, after a minimum duration of time from the reception of the indication of resources, the uplink transmission using the waveform configuration based on the determination of the waveform configuration.

2. The apparatus of claim 1, wherein the at least one processor is further configured to:
   compare the modulation coding scheme index to the threshold modulation coding scheme index, wherein the determination of the waveform configuration is based on the comparison of the modulation coding scheme index to the threshold modulation coding scheme index.

3. The apparatus of claim 2, wherein the at least one processor is further configured to:
   determine that the modulation coding scheme index is greater than the threshold modulation coding scheme index based on the comparison of the modulation coding scheme index to the threshold modulation coding scheme index, wherein to determine the waveform configuration, the at least one processor is configured to:
      determine the first waveform configuration based on the modulation coding scheme index being greater than the threshold modulation coding scheme index.

4. The apparatus of claim 2, wherein the at least one processor is further configured to:
   determine that the modulation coding scheme index is less than or equal to the threshold modulation coding scheme index based on the comparison of the modulation coding scheme index to the threshold modulation coding scheme index, wherein to determine the waveform configuration, the at least one processor is configured to:
      determine the second waveform configuration based on the modulation coding scheme index being less than or equal to the threshold modulation coding scheme index.

5. The apparatus of claim 1, wherein the at least one processor is further configured to:
   receive an indication of the threshold modulation coding scheme index, wherein the determination of the waveform configuration is based on the reception of the indication of the threshold modulation coding scheme index.

6. The apparatus of claim 1, wherein the at least one processor is further configured to:
   transmit, before the reception of the indication of the resources, one or more uplink transmissions; and
   determine that the waveform configuration is different than a third waveform configuration used for the one or more uplink transmissions, wherein the transmission of the uplink transmission is based on the determination that the waveform configuration is different than the third waveform configuration.

7. The apparatus of claim 6, wherein the at least one processor is further configured to:
   identify, based on signaling received from the network device and the determination that the waveform configuration is different than the third waveform configuration, the minimum duration between the indication of the resources and the uplink transmission, wherein the transmission of the uplink transmission is based on the identification of the minimum duration.

8. The apparatus of claim 6, wherein the at least one processor is further configured to:
perform a respective retransmission for one or more active hybrid automatic repeat request processes associated with the one or more uplink transmissions using the third waveform configuration.

9. The apparatus of claim 1, wherein the indication of the resources indicates one or more configured uplink transmissions or indicates a scheduled uplink transmission.

10. The apparatus of claim 1, wherein:
modulation coding scheme indexes of the set of modulation coding scheme indexes that correspond to the first waveform configuration are greater than the threshold modulation coding scheme index; and
modulation coding scheme indexes of the set of modulation coding scheme indexes that correspond to the second waveform configuration are less than or equal to the threshold modulation coding scheme index.

11. The apparatus of claim 1, wherein the modulation coding scheme index is based on a level of a signal to noise ratio associated with uplink communications.

12. The apparatus of claim 1, wherein the first waveform configuration comprises a cyclic prefix orthogonal frequency division multiplexing waveform and the second waveform configuration comprises a discrete Fourier transform spread orthogonal frequency division multiplexing waveform.

13. The apparatus of claim 1, wherein the at least one processor is further configured to:
determine that the modulation coding scheme index corresponds to a subset of modulation coding scheme indexes of the set of modulation coding scheme indexes, the subset of modulation coding scheme indexes associated with the second waveform configuration and with uplink transmissions that have two or more transmission layers; and
transmit the uplink transmission using the second waveform configuration and with two or more transmission layers based on the modulation coding scheme index that corresponds to the subset of modulation coding scheme indexes.

14. The apparatus of claim 1, wherein the at least one processor is further configured to:
receive, from the network device, an indication of a number of transmission layers for the uplink transmission; and
transmit the uplink transmission using the second waveform configuration and with two or more transmission layers based on the indication of the number of transmission layers.

15. An apparatus for wireless communication, comprising:
a memory; and
at least one processor coupled to the memory, wherein the at least one processor is configured to:
transmit an indication of a set of modulation coding scheme indexes associated with both of a first waveform configuration and a second waveform configuration;
transmit, an indication of resources for an uplink transmission and of a modulation coding scheme index from the set of modulation coding scheme indexes and associated with the uplink transmission; and
receive, after a minimum duration of time from the transmission of the indication of resources, the uplink transmission using a waveform configuration that comprises the first waveform configuration or the second waveform configuration, wherein the waveform configuration is based on the modulation coding scheme index and a threshold modulation coding scheme index.

16. The apparatus of claim 15, wherein the waveform configuration comprises the first waveform configuration based on the modulation coding scheme index being greater than the threshold modulation coding scheme index.

17. The apparatus of claim 15, wherein the waveform configuration comprises the second waveform configuration based on the modulation coding scheme index being less than or equal to the threshold modulation coding scheme index.

18. The apparatus of claim 15, wherein the at least one processor is further configured to:
transmit an indication of the threshold modulation coding scheme index, wherein the waveform configuration is based on the indication of the threshold modulation coding scheme index.

19. The apparatus of claim 15, wherein the at least one processor is further configured to:
schedule, before the transmission of the indication of the resources, one or more uplink transmissions associated with a third waveform configuration; and
determine that the waveform configuration is different than the third waveform configuration, wherein the reception of the uplink transmission is based on the determination that the waveform configuration is different than the third waveform configuration.

20. The apparatus of claim 19, wherein the at least one processor is further configured to:
identify, based on the determination that the waveform configuration is different than the third waveform configuration, the minimum duration between the indication of the resources and the uplink transmission, wherein the reception of the uplink transmission is based on the identification of the minimum duration.

21. The apparatus of claim 19, wherein the at least one processor is further configured to:
determine one or more active hybrid automatic repeat request processes associated with the one or more uplink transmissions based on the waveform configuration being different than the third waveform configuration; and
terminate the one or more active hybrid automatic repeat request processes based on the waveform configuration being different than the third waveform configuration.

22. The apparatus of claim 19, wherein the at least one processor is further configured to:
receive a respective retransmission for one or more active hybrid automatic repeat request processes associated with the one or more uplink transmissions using the third waveform configuration.

23. The apparatus of claim 15, wherein the indication of the resources indicates one or more configured uplink transmissions or indicates a scheduled uplink transmission.

24. The apparatus of claim 15, wherein:
modulation coding scheme indexes of the set of modulation coding scheme indexes that correspond to the first waveform configuration are greater than the threshold modulation coding scheme index and modulation coding scheme indexes of the set of modulation coding scheme indexes that correspond to the second waveform configuration are less than or equal to the threshold modulation coding scheme index.

25. The apparatus of claim 15, wherein the waveform configuration is based on a level of a signal to noise ratio for uplink communications.

26. The apparatus of claim 15, wherein the first waveform configuration comprises a cyclic prefix orthogonal frequency division multiplexing waveform and the second waveform configuration comprises a discrete Fourier transform spread orthogonal frequency division multiplexing waveform.

27. The apparatus of claim 15, wherein the at least one processor is further configured to:
  determine the modulation coding scheme index from a subset of modulation coding scheme indexes of the set of modulation coding scheme indexes, the subset of modulation coding scheme indexes associated with the second waveform configuration and with uplink transmissions that have two or more transmission layers; and
  receive the uplink transmission using the second waveform configuration and with two or more transmission layers based on the determination that the modulation coding scheme index corresponds to the subset of modulation coding scheme indexes.

28. The apparatus of claim 15, wherein the at least one processor is further configured to:
  transmit an indication of a number of transmission layers for the uplink transmission; and
  receive the uplink transmission using the second waveform configuration and with two or more transmission layers based on the indication of the number of transmission layers.

29. A method for wireless communication, comprising:
  receiving, from a network device, an indication of a set of modulation coding scheme indexes associated with both a first waveform configuration and a second waveform configuration;
  receiving, from the network device, an indication of resources for an uplink transmission and of a modulation coding scheme index from the set of modulation coding scheme indexes and associated with the uplink transmission;
  determining a waveform configuration from the first waveform configuration and the second waveform configuration based on the modulation coding scheme index and a threshold modulation coding scheme index; and
  transmitting the uplink transmission, after a minimum duration of time from receiving the indication of resources, using the waveform configuration based on determining the waveform configuration.

30. A method for wireless communication at a network device, comprising:
  transmitting an indication of a set of modulation coding scheme indexes associated with both of a first waveform configuration and a second waveform configuration;
  transmitting an indication of resources for an uplink transmission and of a modulation coding scheme index from the set of modulation coding scheme indexes and associated with the uplink transmission; and
  receiving the uplink transmission, after a minimum duration of time from receiving the indication of resources, using a waveform configuration comprising the first waveform configuration or the second waveform configuration, wherein the waveform configuration is based on the modulation coding scheme index and a threshold modulation coding scheme index.

* * * * *